(12) United States Patent
Garg et al.

(10) Patent No.: US 11,170,320 B2
(45) Date of Patent: Nov. 9, 2021

(54) UPDATING MACHINE LEARNING MODELS ON EDGE SERVERS

(71) Applicant: Adobe Inc., San Jose, CA (US)

(72) Inventors: Ankur Garg, Chandigarh (IN); Sunav Choudhary, Bokaro Steel (IN); Saurabh Kumar Mishra, Sonebhadra (IN); Manoj Ghuhan A., Karur (IN)

(73) Assignee: Adobe Inc., San Jose, CA (US)

( * ) Notice: Subject to any disclaimer, the term of this patent is extended or adjusted under 35 U.S.C. 154(b) by 670 days.

(21) Appl. No.: 16/040,057

(22) Filed: Jul. 19, 2018

(65) Prior Publication Data

US 2020/0027033 A1 Jan. 23, 2020

(51) Int. Cl.
*H04L 29/08* (2006.01)
*G06N 20/00* (2019.01)
*G06N 7/00* (2006.01)
*G06F 17/18* (2006.01)

(52) U.S. Cl.
CPC ............. *G06N 20/00* (2019.01); *G06F 17/18* (2013.01); *G06N 7/00* (2013.01); *H04L 67/1095* (2013.01); *H04L 67/28* (2013.01); *H04L 67/34* (2013.01)

(58) Field of Classification Search
CPC ..... H04L 67/10; H04L 67/02; H04L 67/1095; H04L 67/34; H04L 67/28; G06N 20/00; G06N 3/08; G06N 7/00; G06F 17/18
See application file for complete search history.

(56) References Cited

U.S. PATENT DOCUMENTS

| | | | | |
|---|---|---|---|---|
| 2017/0206551 | A1* | 7/2017 | Gupta | G06F 16/9535 |
| 2017/0249067 | A1* | 8/2017 | Marzke | G06F 16/24575 |
| 2018/0032915 | A1* | 2/2018 | Nagaraju | G06K 9/6262 |
| 2018/0352091 | A1* | 12/2018 | Puri | H04M 7/0036 |
| 2019/0318268 | A1* | 10/2019 | Wang | G06N 20/00 |

OTHER PUBLICATIONS

"Edge Computing—Wikipedia", Retrieved at: https://en.wikipedia.org/wiki/Edge_computing—on May 16, 2018, 3 pages.
Boyd, "Distributed Optimization and Statistical Learning via the Alternating Direction Method of Multipliers", Found. Trends Mach. Learn., 3(1):1{122, Jan. 2011, 125 pages.

(Continued)

*Primary Examiner* — Jungwon Chang
(74) *Attorney, Agent, or Firm* — FIG. 1 Patents

(57) ABSTRACT

Systems and techniques are described herein for updating a machine learning model on edge servers. Local parameters of the machine learning model are updated at a plurality of edge servers using fresh data on the edge servers, rather than waiting for the data to reach a global server to update the machine learning model. Hence, latency is significantly reduced, making the systems and techniques described herein suitable for real-time services that support streaming data. Moreover, by updating global parameters of the machine learning model at a global server in a deterministic manner based on parameter updates from the edge servers, rather than by including randomization steps, global parameters of the converge quickly to their optimal values. The global parameters are sent from the global server to the plurality of edge servers at each iteration, thereby synchronizing the machine learning model on the edge servers.

19 Claims, 7 Drawing Sheets

(56) References Cited

OTHER PUBLICATIONS

Duchi,"Adaptive Subgradient Methods for Online Learning and Stochastic Optimization", available at <http://www.magicbroom.info/Papers/DuchiHaSi10.pdf>, Mar. 2010, 40 pages.
Konecny,"Federated Optimization: Distributed Machine Learning for on-Device Intelligence", Oct. 8, 2016, 38 pages.
McMahan,"Communication-Efficient Learning of Deep Networks from Decentralized Data", Proceedings of the 20 th International Conference on Artificial Intelligence and Statistics (AISTATS) 2017. JMLR: W&CP vol. 54, Feb. 28, 2017, 11 pages.
McMahan,"Federated Learning: Collaborative Machine Learning without Centralized Training Data", Google Research Blog—2017, Apr. 16, 2017, 7 pages.
Parker,"Machine Learning From Streaming Data: Two Problems, Two Solutions, Two Concerns, and Two Lessons", https://blog.bigml.com/2013/03/12/machine-learning-from-streaming-data-two-problems-two-solutions-two-concerns-and-two-lessons/, Mar. 12, 2013, 6 pages.

\* cited by examiner

UPDATING MACHINE LEARNING MODELS ON EDGE SERVERS

BACKGROUND

Machine learning models are now commonplace and used to serve clients in a variety of applications, such as personalized advertisement recommendation, speech recognition systems, prediction systems (e.g., to predict what image a user might select or what item a user may purchase), and the like. Because applications using a machine learning model may serve diverse geographies, such as different countries, a machine learning model may be distributed to multiple edge servers from a global server, rather than serving different geographies directly with a global server. For instance, an edge server in India may serve clients in part of India while an edge server in the United States may serve clients in part of the United States, and these edge servers may be provided a machine learning model from a global server located in Europe.

Machine learning models can be dynamically adjusted based on data (e.g., training data including known input and output relationships). Data collected from client devices on edge servers can be passed from the edge servers to the global server and used as training data to update a machine learning model. For instance, the global server can update parameters of the machine learning model, such as filter coefficients in a neural network, and provide the updated machine learning model to the edge servers. The edge servers receive the updated machine learning model and can serve data to client devices, such as suggesting targeted advertisements to particular users, based on the updated machine learning model.

However, this update process can incur significant latency. For instance, edge servers may collect data from client devices at one rate, such as daily, but this data is usually provided to the global server to update the machine learning model at a much slower rate, such as monthly. Hence, the edge servers receive an updated machine learning model that is stale relative to the data used to update the machine learning model. Accordingly, in situations that require low latency, such as an application supporting streaming data to or from a client device (e.g., real-time data), this update process incurs an unacceptable amount of latency and can degrade the quality-of-service of the application.

Latency can also be incurred by optimization methods that are slow to converge. For instance, some methods use randomization steps that significantly slow the convergence of parameters of a machine learning model. Consequently, these optimization algorithms that use randomization steps and result in slow parameter convergence are not suitable in situations that require fast parameter convergence, such as real-time applications operating on streaming data.

Furthermore, because edge servers can be globally distributed, edge servers do not process homogeneous data (e.g., independent and identically distributed data). For instance, client data collected from one country can be statistically different than client data collected from another country due to cultural differences between the two countries that affect internet usage. Moreover, the data can arrive at the edge servers at times uncontrollable by the global server, such as when a user plays a video game. In addition, because of the geographic differences, edge servers often contain different computing resources from one another. Consequently, methods for updating models distributed across nodes that rely on homogeneous data across the nodes, homogeneous compute power, or controlling the data across the nodes are not suitable to updating a machine learning model on edge servers.

Some systems maintain and update machine learning models on client devices, in an effort to keep sensitive data private. For instance, these systems may require that sensitive client data (e.g., user selections that can be used to train a machine learning model) does not leave the client device. Accordingly, because the client data is kept at the client device, these methods are not suitable to updating a machine learning model on edge servers that require the client data to be sent to the edge servers.

SUMMARY

Techniques and systems are described to update a machine learning model on a plurality of edge servers. Training of a machine learning model is done once fresh data arrives to an edge server, rather than waiting for the data to reach a global server. Optimization of the machine learning model is cast in a Lagrangian form that represents a constraint as a penalty, and the optimization is solved locally by each edge server based on fresh data at the edge server. Each edge server serves multiple client devices and computes updates to local parameters of a machine learning model based on user data from the client devices indicative of user behaviors, such as user selections on a touchscreen. The user data is fresh data because it is received on the edge servers, and the edge servers compute updates to the machine learning model, prior to the user data reaching a global server. The edge servers send updated local parameters of the machine learning model to the global server, and the global server updates global parameters of the machine learning model based on the updated local parameters received from the edge servers, such as according to a weighted average of the updated local parameters from the edge servers. The global server then sends the updated global parameters to each of the edge servers, thereby synchronizing the machine learning model on each of the edge servers with each iteration of the update process. The edge servers can serve data to client devices according to the machine learning model with the updated global parameters until different global parameters are received from the global server on a subsequent iteration of the update process. Based on the Lagrangian form, parameters of the machine learning model include a proxy parameter that represents the machine learning model at convergence. Because this process is deterministic and does not include a randomization step, such as to compute a gradient estimate, parameters of the machine learning model converge significantly faster than methods that rely on update algorithms with randomization steps.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities

DETAILED DESCRIPTION

Overview

Figure 1:
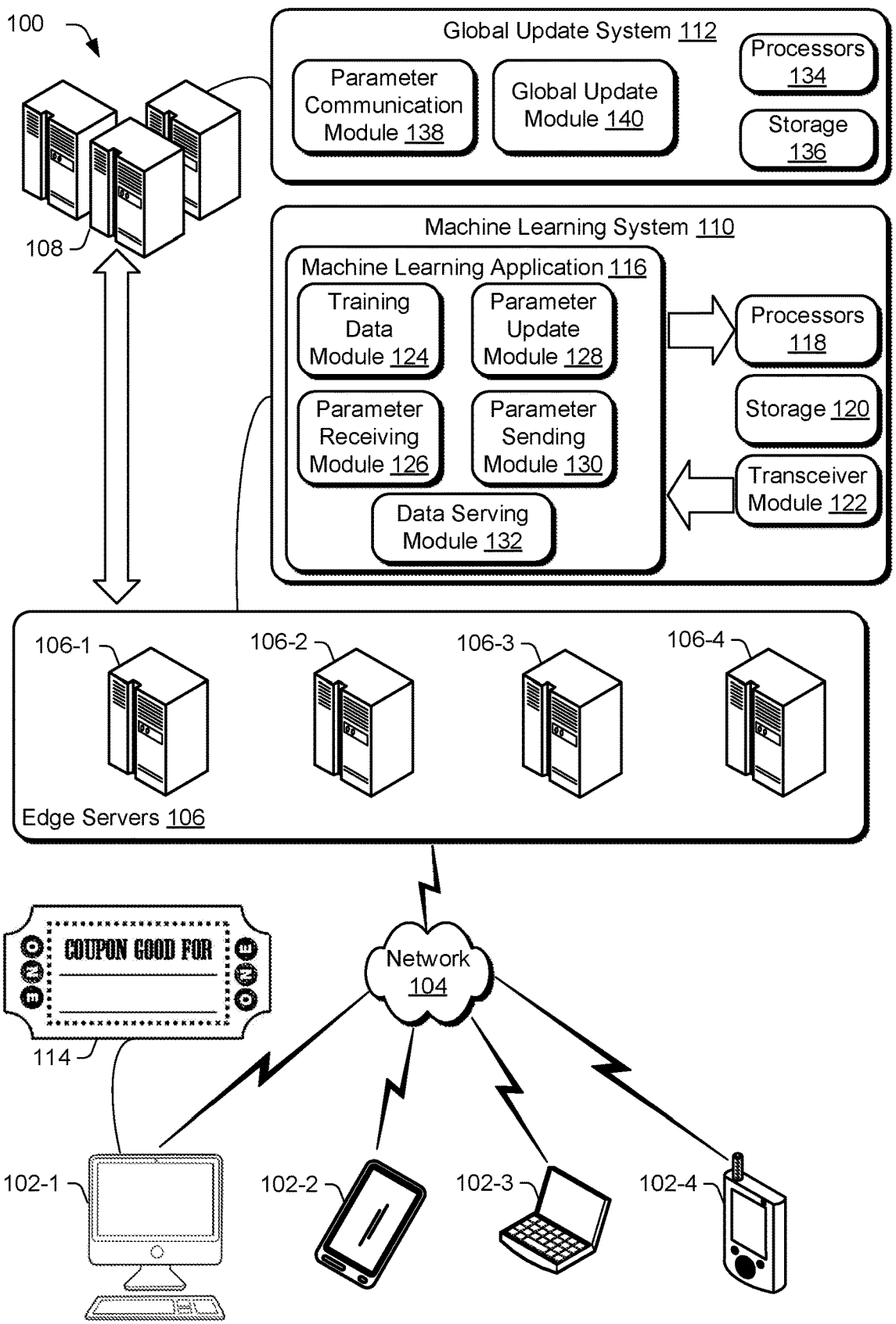
FIG. 1 illustrates a digital medium environment in an example implementation that is operable to employ techniques described herein.

Machine learning models serve clients in a variety of applications, such as advertisement recommendation systems, speech recognition systems, prediction systems (e.g., to predict what image a user might select, what item a user may purchase, what icon a user may select on a touchscreen), and the like. Rather than serving clients across diverse geographies with a global server, a plurality of edge servers are used at different locations, and the edge servers serve data, such as personalized advertisement recommendations, to clients based on a machine learning model on the edge servers. Updating and synchronizing the parameters of the machine learning model on the edge servers based on client data reaching the global server induces significant latency in updating the machine learning model parameters used to serve data to a client relative to the client data used to determine the parameters. For instance, edge servers may collect client data daily, but the global server may not receive the client data and update parameters of the machine learning model until weeks or months after the data is collected by the edge servers. Furthermore, some optimization methods update parameters of a machine learning model based on a randomized algorithm, rather than a deterministic algorithm, so that convergence of the algorithm is slow. Accordingly, because of latency and slow convergence, these update methods may not be suitable for applications that require real-time service, such as a gaming service where items are served from an edge server based on a machine learning model trained from user actions (e.g., user selections made during a current playing of the game or a previous playing of the game).

Furthermore, because edge servers can be globally distributed, edge servers do not process homogeneous data (e.g., independent and identically distributed data). For instance, client data collected from one country can be statistically different than client data collected from another country due to cultural differences between the two countries that affect internet usage. In addition, because of the geographic differences, edge servers often contain different computing resources from one another. Consequently, methods for updating models distributed across nodes that rely on homogeneous data across the nodes, homogeneous compute power, or controlling the data across the nodes are not suitable to updating a machine learning model on edge servers.

Some systems maintain and update machine learning models on client devices, in an effort to keep sensitive data private. For instance, these systems may require that sensitive client data (e.g., user selections that can be used to train a machine learning model) does not leave the client device. Consequently, because the client data is kept at the client device, these methods are not suitable to updating a machine learning model on edge servers.

Accordingly, this disclosure describes systems and techniques for updating machine learning models on edge servers based on fresh data arriving at the edge servers, rather than waiting for client data to arrive at a global server. Hence, latency is significantly reduced and a machine learning model can be trained and used for real-time services, such as streaming-data services.

Optimization of the machine learning model is cast in a Lagrangian form that represents a constraint as a penalty, and the optimization is solved locally by each edge server based on fresh data at the edge server. Based on the Lagrangian form, parameters of the machine learning model include a proxy parameter that represents the machine learning model at convergence. Each edge server computes updates to local parameters of a machine learning model, including updates to the proxy parameter, based on user data from a client device indicative of a user behavior, such as user touches on a touchscreen, user selections, purchase history, and the like. The user data is fresh data because it is received on the edge servers, and the edge servers compute updated local parameters of the machine learning model, prior to the user data reaching the global server. Additionally or alternatively, user data used to generate updated local parameters by an edge server can include previous data received by an edge server, such as data used in a previous iteration of updating a machine learning model on a plurality of edge servers.

A machine learning model implemented on a plurality of edge servers can include any suitable model, such as a linear regression model, a logistic regression model, or a feedforward neural network. In one example, a machine learning model includes a linear regression model, and edge servers update local parameters of a machine learning model by updating a first parameter based on data indicative of a user behavior received from a client device, a Lagrangian penalty variable, and a Lagrangian dual variable included in global parameters received from global server to form an updated first parameter. Additionally or alternatively, a soft threshold can be applied to a combination of the updated first parameter and a ratio of the Lagrangian dual variable and the Lagrangian penalty variable to form an updated proxy parameter included in updated local parameters sent to the global server.

The edge servers send updated local parameters of the machine learning model to the global server. In one example, the edge servers send updated local parameters to the global server responsive to the edge servers receiving a threshold amount of fresh data from a client device, such as a predetermined number of clicks (e.g., one, ten or a hundred clicks). Updated local parameters sent to the global server can be represented as differences between parameters, such as differences between updated local parameters generated by an edge server and global parameters received from a global server. In one example, parameter updates sent to a global server from edge servers include a parameter update vector that includes updates to proxy parameters for the machine learning model and a Lagrangian update vector including updates to Lagrangian variables.

A global server updates global parameters of a machine learning model based on updated local parameters received from edge servers. In one example, the global server updates parameters of the machine learning model from a weighted average of the parameter updates received from edge servers to form updated global parameters of the machine learning model. The weighted average can be computed with weights determined from designators included in parameter updates received from a plurality of edge servers that indicate a number of data points in client data (e.g., fresh data) received from a client device.

Each iteration of the update process, the global server sends updated global parameters to each of the edge servers, thereby synchronizing the machine learning model on each of the edge servers. The edge servers can serve data to client devices according to the machine learning model with the updated global parameters until different global parameters are received from the global server on a subsequent iteration of the update process.

Because the methods described herein are deterministic and do not include a randomization step, parameters of the machine learning model converge significantly faster than methods that rely on update algorithms with randomization steps. Moreover, because parameters of the machine learning model are updated locally by the edge servers using fresh data on the edge servers prior to the data arriving at the global server, latency is significantly reduced compared to methods that rely on updates generated at the global server based on user data arriving at the global server.

Consequently, the systems, techniques, and devices described herein are suitable to applications with streaming data, real-time data, and the like. For instance, data arriving at edge servers between scheduled communication rounds can be used at the edge servers to initiate a communication round between the edge servers and a global server, causing the edge servers to generate updated local parameters that are sent to the global server, and updated global parameters of the machine learning model to be sent to the edge servers in return, thereby synchronizing the machine learning model on the edge servers without waiting for data from client devices to reach the global server.

Furthermore, the systems, techniques, and devices described herein are deterministic and have no requirements that the edge servers process homogeneous data (e.g., independent and identically distributed data), like many distributed learning systems. In contrast, edge servers described herein can receive heterogeneous client data from one another (e.g., the statistics of client data on one edge server can be different than the statistics of client data on another edge server).

Term Examples

"Model parameters" are parameters of a machine learning model that are to be found by training the machine learning model, and are denoted by w.

"Local parameters" are parameters of a machine learning model updated locally at an edge server, and are subscripted by k to denote one of a plurality of edge servers.

"Global parameters" are parameters of a machine learning model updated by a global server using parameter updates from a plurality of edge servers, and are therefore not subscripted by k.

"Fresh data", denoted by $A_k$ and $b_k$ with any suitable superscript to indicate iteration number, includes training data received by an edge server from a client device, is indicative of a user behavior (e.g., a user selection), and has not yet reached the global server.

"Lagrangian dual variable" is denoted by u and is a variable introduced when recasting a constrained optimization in Lagrangian form.

"Lagrangian penalty parameter" is denoted by ρ and is a non-negative weight of a penalty term representing a constraint in a Lagrangian equation.

"Proxy parameter", denoted by z, is introduced in a constraint of a constrained optimization and approximates w at convergence of the machine learning model.

"Iteration", denoted by superscript i, refers to an iteration of updating parameters of a machine learning model, and includes communication of local parameter updates based on fresh data at the edge servers from the edge servers to a global server, and communication of updated global parameters from the global server to the edge servers, synchronizing the machine learning model on the edge servers at each iteration of the update process.

"Digital medium environment" refers to the various computing devices and resources that can be utilized to implement the techniques described herein.

Superscript i denotes an iteration index, and subscript k denotes an edge server index among K edge servers.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes computing device 102-1 (e.g., a desktop computer), computing device 102-2 (e.g., a tablet), computing device 102-3 (e.g., a laptop computer), and computing device 102-4 (e.g., a smart phone), collectively referred to as computing devices 102. Computing devices 102 are examples of user devices (e.g., client devices) and are depicted in FIG. 1 as a desktop computer, tablet, laptop, and smartphone as example computing devices. Generally, computing devices 102 can be any suitable computing device, such as a mobile phone, tablet, laptop computer, desktop computer, gaming device, goggles, glasses, wearable device (e.g., a wristband, watch, or headband), camera, digital assistant, echo device, navigation device, home appliance, copier, scanner, test and measurement equipment, vehicle computing system, and the like. Hence, computing devices 102 may range from a full resource device with substantial memory and processor resources (e.g., personal computers, game consoles) to a low-resource device with limited memory or processing resources (e.g., mobile devices).

Various types of input devices and input instrumentalities can be used to provide input to computing devices 102. For example, computing devices 102 can recognize input as being a mouse input, stylus input, touch input, input provided through a natural user interface, and the like. Thus, computing devices 102 can recognize multiple types of gestures including touch gestures and gestures provided through a natural user interface. In one example, computing devices 102 include speech recognition, identification, and synthesis functionalities, microphones, and speakers that allow computing devices 102 to communicate with a user in a conversation, e.g., a user conversation.

Figure 7:
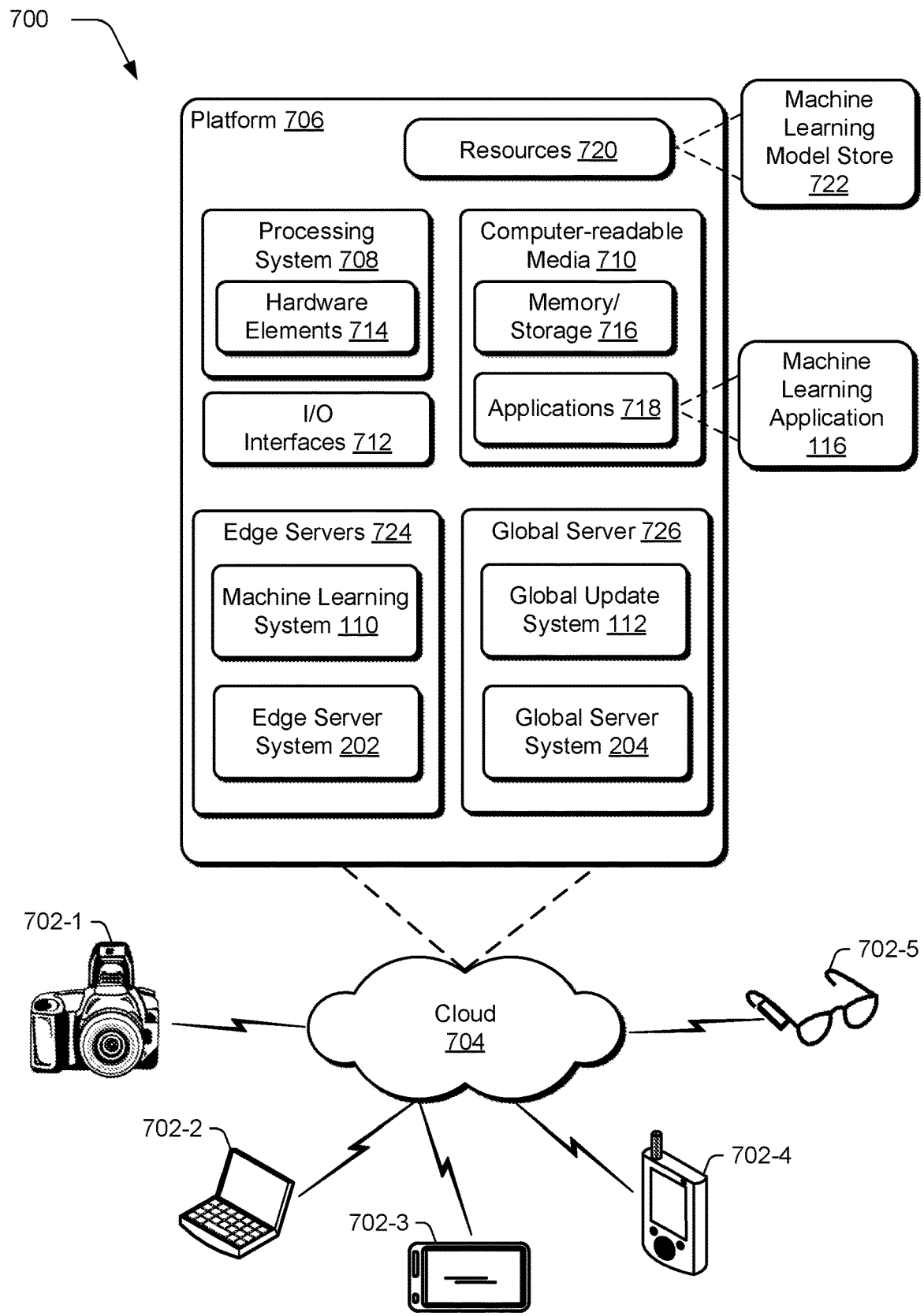
FIG. 7 illustrates an example system including various components of an example device that can be implemented as any type of computing device as described and/or utilized with reference to FIGS. 1-6 to implement aspects of the techniques described herein.

Furthermore, each of computing devices 102 may be representative of one or a plurality of different devices, such as one or more devices connected to a network that perform operations "over the cloud" as further described in relation to FIG. 7. In one example, at least one of computing devices 102 includes a plurality of computing devices communicatively coupled to each other, such as with a low power wireless communication standard (e.g., a Bluetooth® protocol).

Network 104 communicatively couples computing devices 102 with edge servers 106. Network 104 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Edge servers 106 can include any suitable number of edge servers. In the example in FIG. 1, edge servers 106 includes edge server 106-1, edge server 106-2, edge server 106-3, and edge server 106-4, collectively referred to as edge servers 106. Each of edge servers 106 may be representative of one or a plurality of different devices, and serve any suitable client device. For instance, edge servers 106 can include edge servers that are located in different geographies, and serve clients local to the geography where the edge server is located. As an example, edge server 106-1 may be located in the United States to serve clients in the United States, and edge server 106-2 may be located in India to serve clients in India. In one example, computing device 102-1 represents client devices served by edge server 106-1, computing device 102-2 represents client devices served by edge server 106-2, computing device 102-3 represents client devices served by edge server 106-3, and computing device 102-4 represents client devices served by edge server 106-4. Additionally or alternatively, computing devices 102 can represent multiple client devices served by one of edge servers 106, such as edge server 106-1.

Edge servers 106 collect data (e.g., fresh data) from computing devices connected to the edge servers and use the data as training data to update a machine learning model. For instance, edge server 106-1 can collect data from computing device 102-1 indicative of a user behavior, such as user selections, purchases, images viewed, touches on a touchscreen, web pages viewed, user-gestures, and the like. Because edge servers 106 are not collocated, edge servers 106 generally collect and process heterogeneous data from one another, such as data that is not homogeneous and not independently and identically distributed. For instance, data collected and served by one edge server (e.g., edge server 106-1) can be statistically different than data collected and served by another edge server (e.g., edge server 106-2) due to cultural differences between the two countries where the edge servers are located that affect internet usage. Moreover, because edge servers 106 are generally not collocated, edge servers 106 may not have the same processing resources. For instance, edge server 106-1 may have more computing resources (e.g., larger number of processors, higher clock speed, etc.) than edge server 106-2, but fewer computing resources than edge server 106-3.

Edge servers 106 are coupled to global server 108. Global server 108 can include any suitable number of computing devices. In one example, global server 108 includes a plurality of servers that are collocated with each other and coupled to each other, such as a plurality of servers collocated with each other, and located separately from each of edge servers 106. Additionally or alternatively, global server 108 can include servers with more computing resources than edge servers 106 (e.g., larger number of processors, higher clock speed, etc.). Moreover, global server 108 generally does not control when fresh data arrives at edge servers 106 from computing devices 102, since the timing of data arrival to edge servers 106 may be dependent on user activities uncontrollable by global server 108, such as when a user of one of computing devices 102 plays a video game.

Edge servers 106 and global server 108 work together to implement and update a machine learning model on edge servers 106, and serve data to computing devices 102 based on the machine learning model on edge servers 106. A machine learning model on edge servers 106 can be any suitable model for any suitable purpose, such as a machine learning model for personalized advertisement recommendation which serves advertisements to users, a coupon distribution service, to predict whether a user will purchase a product within a window of time in an ecommerce application, to predict a next product a user will purchase, to customize a user interface exposed to a user, to provide images to a user in an image editing application, to ascertain or predict user touches on a touchscreen, to improve performance of a speech recognition system, combinations thereof, and the like. Edge servers 106 and global server 108 work in conjunction to iteratively train (e.g., update parameters of) a machine learning model implemented on edge servers 106.

Each of edge servers 106 includes machine learning system 110, and global server 108 includes global update system 112. In the example in FIG. 1, machine learning system 110 and global update system 112 update parameters of a machine learning model implemented on edge servers 106, and at least one of edge servers 106 serves coupon 114 to at least one of computing devices 102. For instance, coupon 114 is an example of a targeted, personalized advertisement and may be selected with a machine learning model implemented on edge servers 106 based on user selections made on one of computing devices 102.

Machine learning system 110 includes machine learning application 116 (discussed below in more detail) to provide local parameter updates of the machine learning model to global update system 112. Local parameter updates are based on fresh data received by edge servers 106 from computing devices 102 (e.g., data available to edge servers 106, but not available to global server 108). Global update system 112 of global server 108 averages local parameter updates received from edge servers 106, and provides updated global parameters for the machine learning model back to edge servers 106, thereby synchronizing the machine learning model on edge servers 106. This communication between edge servers 106 and global server 108 describes an iteration of the update process, and can be repeated based on fresh data arriving at the edge servers 106 until parameters of the machine learning model converge. Convergence of parameters of a machine learning model can be determined in any suitable way, such when values of global parameters generated by global server 108 change by an amount below a convergence threshold amount from one iteration to another iteration for a prescribed number of iterations, such as below one percent change in model parameters for ten consecutive iterations. Fresh data has reached edge servers 106, but not yet reached global server 108. In one example, fresh data includes data collected by edge servers 106 after an update of global parameters of the machine learning model is received from global server 108 at edge servers 106.

In the example illustrated in FIG. 1, machine learning system 110 and global update system 112 update a machine learning model on edge servers 106 to serve advertisements to computing devices 102, and computing device 102-1 displays a coupon 114 included as part of a personalized advertisement recommendation. Because machine learning system 110 on edge servers 106 provides local parameter updates based on fresh data collected at edge servers 106, rather than waiting for the data to reach global server 108, a machine learning model updated by machine learning system 110 and global update system 112 and implemented on edge servers 106 quickly converges, so that edge servers 106 can serve data based on the machine learning model to computing devices 102 in streaming-data and real-time applications. In one example, a user searching a web site for the first time may be served advertisements personalized for the user by a machine learning model on edge servers 106 based on items viewed (e.g., clicks made) by the user on the web site. In another example, a user playing an online game is served attributes of the game (e.g., points, super-powers, weapons, etc.) according to parameters of a machine learning model updated while the user is playing the game based on user selections made during the game.

Edge servers 106 include machine learning system 110. Machine learning system 110 includes machine learning application 116 (discussed below in more detail). Machine learning system 110 also includes processors 118. Processors 118 can include any suitable number and any suitable type of processor. In one example, machine learning system 110 is implemented at least partially by storing instructions on storage 120 and executing the instructions on processors 118 included in machine learning system 110. For instance, processors 118 may execute portions of machine learning application 116.

Machine learning system 110 includes storage 120. Storage 120 can be any suitable type of storage accessible by or contained in machine learning system 110. Storage 120 stores data in memory, and provides access to and from memory included in storage 120 for any suitable type of data. For instance, storage 120 includes storage for training data (e.g., data indicative of a user behavior from a client device, such as one of computing devices 102, including known input and output data that can be used to train a machine learning model, and the like), parameter data (e.g., parameters of a machine learning model, such as local parameters generated or updated by one of edge servers 106, global parameters of a machine learning model received from global server 108, updates to parameters, such as differences between parameters of a machine learning model, and the like), and client data (e.g., data served to a client computing device, such as one of computing devices 102, based on a machine learning model, including personalized advertisements, images, speech parameters, coupons, documents, web pages, assets, user interfaces, and the like).

Machine learning system 110 includes transceiver module 122. Transceiver module 122 is representative of functionality configured to transmit and receive data using any suitable type and number of communication protocols. For instance, data within machine learning system 110 may be transmitted to one of computing devices 102 with transceiver module 122 over network 104. Furthermore, data can be received from one of computing devices 102 with transceiver module 122. Transceiver module 122 can also transmit and receive data between edge servers 106, global server 108, and combinations thereof. In one example, transceiver module 122 communicates packetized data.

Though the description of machine learning system 110, machine learning application 116, and global update system 112 describes updating a machine learning model to serve personalized advertisement recommendations, a machine learning model can be updated to serve any suitable type of data, such as assets, images, web pages, documents, coupons, user interfaces, and the like. Moreover, machine learning system 110, machine learning application 116, and global update system 112 may predict any suitable user behavior, such as where a user may touch next on a touchscreen, what image a user may view, what web page a user may access, and the like.

Machine learning system 110, machine learning application 116, and global update system 112 may update parameters of a machine learning model by optimizing any suitable objective function for any suitable model. In one example, parameters of a machine learning model are found via machine learning system 110, machine learning application 116, and global update system 112 by solving (e.g., optimizing) a linear regression problem class for a linear regression model. Additionally or alternatively, a machine learning model can include a logistic regression model (e.g., logarithms of probabilities are expressed as linear combinations of variables) or a neural network (e.g., a feedforward neural network). For simplicity, an $l_1$-norm linear regression model is described as an example of a machine learning model. However, an $l_1$-norm linear regression model is described as an example, and a machine learning model updated by machine learning system 110, machine learning application 116, and global update system 112 can include any suitable model, such as a linear regression model, a logistic regression model, or a feedforward neural network.

An $l_1$-norm linear regression problem can be expressed as $$\min_w \left( \frac{1}{2} \cdot \|b - Aw\|_2^2 + \lambda \cdot \|w\|_1 \right).$$

Here, $A \in \mathbb{R}^{n \times m}$ is a matrix of n samples represented by m features that are used to describe a user. For instance, matrix A may include user data for any suitable features, such as a time of day, day of week, device operated by a user (e.g., desktop or mobile device), and the like. Vector $b \in \mathbb{R}^n$ includes user responses (e.g., user clicks) for samples in matrix A. Matrix A and vector b are examples of data indicative of a user behavior received by edge servers 106 from computing devices 102 that can be used to train a machine learning model to find optimum parameters w. Vector $w \in \mathbb{R}^m$ is a parameter vector including parameters of a machine learning model updated via machine learning system 110, machine learning application 116, and global update system 112. Scalar $\lambda > 0$ is a regularization parameter, and can be any suitable value, such as between 0.01 and 0.1. $\|\cdot\|_1$ denotes $l_1$-norm and $\|\cdot\|_2$ denotes $l_2$-norm.

Since edge servers 106 receive heterogeneous data compared to one another from computing devices 102, the $l_1$-norm linear regression problem above can be rewritten for K edge servers with subscript k denoting one of the K edge servers as $$\min_w \left( \frac{1}{2} \sum_{k=1}^{K} l_k(w) + \lambda \cdot \|w\|_1 \right)$$

where $l_k(w) = \|b_k - A_k w\|_2^2$ and $A_k$, $b_k$ denote the data residing on the $k^{th}$ edge server (e.g., data received by one of edge servers 106 from one or more of computing devices 102).

This linear regression problem can be recast as a constrained optimization problem using a proxy variable $z \in \mathbb{R}^m$ that approximates w at convergence $$\min_{w,z} \left( \frac{1}{2} \sum_{k=1}^{K} l_k(w) + \lambda \cdot \|z\|_1 \right)$$
$$\text{s.t. } w - z = 0.$$

Here, the constraint is expressed as w−z=0. This constrained optimization problem can be reformulated as a Lagrangian equation in which the hard constraint w−z=0 is replaced by a softer quadratic penalty term, $$L_p(w, z, u) = \frac{1}{2} \sum_{k=1}^{K} l_k(w) + \lambda \cdot \|z\|_1 + u^T(w - z) + \frac{\rho}{2} \|w - z\|_2^2.$$

Here, $u \in \mathbb{R}^m$ is a Lagrangian dual variable and scalar $\rho > 0$ is a penalty parameter, such as between $10^{-4}$ and $10^{-3}$. By replacing the hard constraint w−z=0 with the quadratic penalty term $$\frac{\rho}{2} \|w - z\|_2^2,$$

an optimum parameter vector w of the machine learning model can be found more quickly with the Lagrangian equation than by directly solving the constrained linear regression problem.

Since each one of edge servers 106 receives its own data $A_k$, $b_k$, and does not have knowledge of the data for other edge servers (e.g., for other k), the linear regression optimization and Lagrangian equation local to each one of edge servers 106 can be expressed as $$\min_{w,z} \left( \frac{1}{2} l_k(w) + \lambda \cdot \|z\|_1 \right)$$
$$\text{s.t. } w - z = 0$$
and
$$L_p(w, z, u) = \frac{1}{2} l_k(w) + \lambda \cdot \|z\|_1 + u^T(w - z) + \frac{\rho}{2} \|w - z\|_2^2,$$

respectively, where the sum over all K edge servers has been replaced with data local to each edge server.

Accordingly, machine learning system 110, machine learning application 116, and global update system 112 update parameters of a machine learning model by iteratively optimizing a linear regression optimization that is reformulated as a Lagrangian equation with data local to each one of edge servers 106. Each iteration includes communication between edge servers 106 and global server 108, using data generated with machine learning system 110 and global update system 112, respectively. For instance, for each iteration, each of edge servers 106 may compute updates to local parameters of a machine learning model (e.g., updates to z and u) based on data local to each of the edge servers (e.g., $A_k$ and $b_k$). This local data may include fresh data that has not yet reached global server 108. Each of edge servers 106 send the updates to global server 108, which computes updates to global parameters of the machine learning model based on the updated local parameters received from edge servers 106, such as with a weighted average of the updated local parameters received from edge servers 106. Global server 108 sends the updated global parameters to edge servers 106, thereby synchronizing the machine learning model on edge servers 106 at each iteration of the update process. This iterative process can be repeated until convergence, which can be measured in any suitable way. In one example, convergence is determined when updated global parameters received at edge servers 106 from global server 108 change from one iteration to another iteration by an amount less than a convergence threshold.

Hence, machine learning system 110 of edge servers 106 includes machine learning application 116, and global server 108 includes global update system 112 to iteratively solve for parameters of a machine learning model by solving an optimization problem (e.g., a linear regression problem) that is reformulated as a Lagrangian equation with data local to edge servers 106.

Machine learning system 110 includes machine learning application 116. Machine learning application 116 includes training data module 124, parameter receiving module 126, parameter update module 128, parameter sending module 130, and data serving module 132. These modules work in conjunction with each other to update a machine learning model and synchronize it on edge servers 106, and to provide data (e.g., personalized advertisement recommendations) based on the machine learning model to computing devices 102.

Training data module 124 is representative of functionality configured to receive client data for a machine learning model. In one example, training data module 124 receives client data indicative of a user behavior from a client device, such as one of computing devices 102. For instance, training data module 124 may receive data $A_k$ and $b_k$, which may indicate a user behavior (e.g., a user selection in an e-commerce web page) that can be used to train a machine learning model that is implemented on edge servers 106.

Training data module 124 may obtain fresh data, such as data received by one of edge servers 106 after global parameters of a machine learning model are obtained from global server 108. Hence, fresh data obtained by training data module 124 may be used to generate updates to parameters of a machine learning model before the data reaches global server 108. Additionally or alternatively, training data module 124 may store data obtained from one of computing devices 102, so that previous data received by an edge server (e.g., data received by an edge server before global parameters of a machine learning model are obtained from global server 108) can be used by the edge server to generate updates to local parameters of a machine learning model.

Training data module 124 may receive training data from computing devices 102 in any suitable way. In one example, training data module 124 receives data from one or more of computing devices 102 periodically, such as daily. Additionally or alternatively, training data module 124 may receive training data, such as $A_k$ and $b_k$, from one or more of computing devices 102 based on a query sent from training data module 124 to one or more of computing devices 102. For instance, one of edge servers 106 may send a request to one or more of computing devices 102 to provide fresh data to the edge server if fresh data is available on the computing device.

In one example, fresh data is received by training data module 124 responsive to the fresh data being available on one of computing devices 102. For instance, a user may navigate to a web page exposed on computing device 102-1, and select items to view on the web page. Based on the user selecting the items on the web page, computing device 102-1 may send fresh data, such as data indicative of a user behavior to select the items on the web page, to edge server 106-1. Responsive to receiving fresh data from computing device 102-1, edge server 106-1 may compute an update to local parameters of a machine learning model and initiate an iteration to update global parameters of the machine learning model with global server 108, and synchronize the machine learning model on edge servers 106 with the updated global parameters. Edge server 106-1 may then serve data to the user on computing device 102-1 based on the machine learning model updated from the user behavior, such as by providing targeted advertisements to the user based on the user selections on the web page.

Training data received by training data module 124, along with any suitable information, such as an indicator of a client computing device that sends training data (e.g., one of computing devices 102), metadata (e.g., indicators of applications used to gather training data on a client computing device, a timestamp indicating when training data was gathered, user actions, and the like), fresh data, previous data including data that was fresh data in a previous iteration of updating a machine learning model, and the like, used by or calculated by training data module 124 are stored in storage 120 and made available to modules of machine learning application 116. In one example, training data module 124 provides fresh data to parameter update module 128 based on client data obtained by training data module 124.

Parameter receiving module 126 is representative of functionality configured to receive global parameters of a machine learning model from a global server, such as global server 108. Additionally or alternatively, parameter receiving module 126 receives updated global parameters of the machine learning model from a global server, the updated global parameters synchronizing the machine learning model on a plurality of edge servers. Parameter receiving module 126 can receive global parameters of a machine learning model in any suitable way. In one example, parameter receiving module 126 receives global parameters from global update system 112 that have been generated using local parameters from machine learning application 116 that were sent to global update system 112, such as in an iteration of updating parameters of a machine learning model.

Parameter receiving module 126 can receive any suitable global parameter of a machine learning model. In one example, global parameters received by parameter receiving module 126 include Lagrangian dual variable u and proxy parameter z. For instance, parameter receiving module 126 may receive $u^i$ and $z^i$, where superscript i denotes any suitable iteration number for updating a machine learning model. Parameter receiving module 126 can receive global parameters of a machine learning model in any suitable way or format. In one example, parameter receiving module 126 receives a concatenation of $u^i$ and $z^i$, such as $u^i|z^i$, where "|" denotes any suitable concatenation operator, such as appending, interleaving, and the like. Additionally or alternatively, parameter receiving module 126 receives global parameters of a machine learning model in a payload portion of a data packet. A header portion of the data packet can indicate any suitable information, such as a timestamp of when the global parameters were generated by global server 108, an iteration number, statistics about the global parameters, such as data regarding weights and edge servers that provided parameter updates contributing to updating the global parameters, combinations thereof, and the like.

In one example, global parameters received by parameter receiving module 126 include an initialization parameter setting, such as randomized initialization from a global server. An initialization parameter setting can be used to train a plurality of edge servers by starting parameter update from a same parameter setting for each of the edge servers.

Global parameters received by parameter receiving module 126, along with any suitable information, such as an iteration number, weights used to update the global parameters by global server system 204, a difference of updated global parameters and previous global parameters, an initialization setting, and the like, used by or calculated by parameter receiving module 126 are stored in storage 120 and made available to modules of machine learning application 116. In one example, parameter receiving module 126 provides global parameters of a machine learning model to parameter update module 128.

Parameter update module 128 is representative of functionality configured to update local parameters of a machine learning model to form updated local parameters. In one example, parameter update module 128 updates local parameters of a machine learning model to form updated local parameters based on data indicative of user behavior received from a client device (e.g., data obtained by training data module 124 from one of computing devices 102, such as fresh data $A_k$ and $b_k$) and global parameters received from global server 108 (e.g., $u^i$ and $z^i$). For instance, parameter update module 128 updates local parameters of a machine learning model at an $i^{th}$ iteration according to $$w_k^{i+1} \leftarrow (A_k^T A_k + \rho I)^{-1}(A_k^T b_k + \rho z^i - u^i)$$

$$z_k^{i+1} \leftarrow S_{\frac{\lambda}{\rho}}\left(w_k^{i+1} + \frac{u^i}{\rho}\right)$$

$$u_k^{i+1} \leftarrow u^i + \rho(w_k^{i+1} - z_k^{i+1})$$

to form updated local parameters $w_k^{i+1}$, $z_k^{i+1}$, and $u_k^{i+1}$. At convergence, $w_k \approx z$ for all $k \in \{1, 2, \ldots K\}$.

Recall that subscript k denotes an edge server index among K edge servers, and superscript i denotes iteration number. Furthermore, an identity matrix is denoted by I, and $S_\tau(\cdot)$ denotes any suitable threshold operator. In one example, $S_\tau(\cdot)$ denotes a soft-threshold operator applied element-by-element (e.g., element-wise) according to $$S_\tau(y) = \begin{cases} y - \tau, & y > \tau \\ y + \tau, & y < -\tau \\ 0, & \text{otherwise} \end{cases}$$

for any real-valued scalar y.

Hence, updated local parameters generated by parameter update module 128 include a proxy parameter that represents the machine learning model at convergence, $z_k^{i+1}$, and the proxy parameter can be determined by applying a soft threshold to an updated local parameter for the machine learning model, $w_k^{i+1}$.

In one example, parameter update module 128 determines differences between parameters, such as differences between updated local parameters (e.g., $z_k^{i+1}$ and $u_k^{i+1}$) and global parameters received from global server 108 (e.g., $z_i$ and $u_i$), and provides these differences to global update system 112 to update global parameters of a machine learning model. For instance, parameter update module 128 may generate parameter updates according to $$\Delta z_k^{i+1} = z_k^{i+1} - z_i$$

$$\Delta u_k^{i+1} = u_k^{i+1} - u_i$$

and these differences may be included in updated local parameters provided by parameter update module 128. Additionally or alternatively, parameter update module 128 includes values of $z_k^{i+1}$ and $u_k^{i+1}$ with updated local parameters (e.g., parameter updates).

In one example, parameter update module 128 includes indicators with parameter updates (e.g., updated local parameters) that can be used by global update system 112 to normalize updates from edge servers 106 based on data received by training data module 124. For instance, parameter update module 128 can generate scaling vector $h_k \in \mathbb{R}^m$ and non-negative integer $\eta_k$ that can be used by global update system 112 to give more or less weight to updated local parameters from different edge servers. Scaling vector $h_k$ and integer $\eta_k$ can be generated in any suitable way. In one example, scaling vector $h_k$ and integer $\eta_k$ are generated so that the $j^{th}$ element of scaling vector $h_k$ denotes a number (e.g., a fraction) of non-zero values in the $j^{th}$ column of $A_k$, and $\eta_k$ denotes a number of rows in $A_k$. Hence, more weight can be given to edge servers with greater numbers of data points in $A_k$.

Updated local parameters determined by parameter update module 128, along with any suitable information, such as an iteration number, threshold used to determine an updated proxy parameter, normalization parameters, such as scaling vector $h_k$ and integer $\eta_k$, parameter updates such as $\Delta z_k^{i+1}$ and $\Delta u_k^{i+1}$, and the like, used by or calculated by parameter update module 128 are stored in storage 120 and made available to modules of machine learning application 116. In one example, parameter update module 128 provides updated local parameters including $\Delta z_k^{i+1}$ and $\Delta u_k^{i+1}$ to parameter sending module 130 and updated model parameters $w_k^{i+1}$ to data serving module 132. Additionally or alternatively, parameter update module 128 provides scaling vector $h_k$ and integer $\eta_k$ to parameter sending module 130.

Parameter sending module 130 is representative of functionality configured to send updated local parameters to a global server, such as global server 108. Parameter sending module 130 can send any suitable updated local parameter to any suitable global server. In one example, parameter sending module 130 receives parameter updates including $\Delta z_k^{i+1}$ and $\Delta u_k^{i+1}$ from parameter update module 128 and sends the parameter updates to global update system 112 via transceiver module 122. Additionally or alternatively, parameter updates sent from parameter sending module 130 may include designators for determining normalization weights, such as scaling vector $h_k$ and integer $\eta_k$.

Parameter sending module 130 can send any suitable local parameter update in any suitable format. In one example, parameter sending module 130 packetizes $\Delta z_k^{i+1}$, $\Delta u_k^{i+1}$, $h_k$, and $\eta_k$ into one or more data packets for communication to a global server. A header of a data packet may include any suitable information, such as data regarding the edge server sending the data packet, e.g., an identification number of an edge server, a timestamp of client data used to generate updated local parameters, a priority value (e.g., an indication of whether a user is operating a real-time application, such as one delivering streaming data), combinations thereof, and the like.

Updated local parameters sent by parameter sending module 130, along with any suitable information, such as an iteration number, an indication of whether normalization tools (e.g., $h_k$ and $\eta_k$) are included in the updated local parameters, an indication whether parameter updates sent by parameter sending module 130 include differences of parameters, updated local parameters, or combinations thereof, a format used to send parameter updates, such as packet type, and the like, used by or calculated by parameter sending module 130 are stored in storage 120 and made available to modules of machine learning application 116. In one example, parameter sending module 130 sends updated local parameters of a machine learning model to global update system 112 of global server 108. For instance, updated local parameters sent by parameter sending module 130 to global update system 112 can include $\Delta z_k^{i+1}$, $\Delta u_k^{i+1}$, $h_k$, and $\eta_k$. In one example, parameter sending module 130 concatenates at least two of $\Delta z_k^{i+1}$, $\Delta u_k^{i+1}$, $h_k$, and $\eta_k$.

Data serving module 132 is representative of functionality configured to serve data to a client device (e.g., one of computing devices 102) according to a machine learning model implemented on edge servers 106 and updated with machine learning system 110 and global update system 112. Data serving module 132 can serve any suitable data for any suitable machine learning model, such as advertisements, coupons, assets, pictures, videos, documents, animations, user interfaces, web pages, maps, features of a game, such as rewards, points, super-powers, virtual currency, etc., combinations thereof, and the like. In the example in FIG. 1, data serving module 132 serves coupon 114 to computing device 102-1.

In one example, data serving module 132 serves data according to a machine learning model with updated local parameters (e.g., model parameters $w_k^{i+1}$ generated as described above from global parameters $u^i$ and $z^i$) until different global parameters are received from a global server, such as in a subsequent iteration when updating the machine learning model. For instance, parameter update module 128 may provide local model parameters $w_k^{i+1}$ to data serving module 132 to serve data to client devices until a machine learning model is synchronized on a plurality of edge servers. Once the machine learning model is synchronized on the plurality of edge servers, parameter update module 128 may provide global model parameters $z^{i+1}$ to data serving module 132 to serve data to client devices. Hence, data serving module 132 serves data to one of computing devices 102 based on fresh data at edge servers 106 so that latency is significantly reduced and real-time services, such as streaming-data services, can be supported.

Data served by data serving module 132, along with any suitable information, such as an iteration number, a measure of convergence of parameters of a machine learning model (e.g., a score obtained from differences of model parameters between iterations), statistics of data served by data serving module 132, and the like, used by or calculated by data serving module 132 are stored in storage 120 and made available to modules of machine learning application 116. In one example, data serving module 132 serves data to one or more of computing devices 102.

Global server 108 communicates with machine learning system 110 to update and synchronize parameters of a machine learning model on edge servers 106. Accordingly, global server includes global update system 112. Global update system 112 includes processors 134. Processors 134 can include any suitable number and any suitable type of processor. In one example, global update system 112 is implemented at least partially by storing instructions on storage 136 and executing the instructions on processors 134.

Global update system 112 includes storage 136. Storage 136 can be any suitable type of storage accessible by or contained in global update system 112. Storage 136 stores data in memory, and provides access to and from memory included in storage 136 for any suitable type of data. For instance, storage 136 includes storage for parameter communication module 138 and global update module 140 of global update system 112.

Parameter communication module 138 is representative of functionality configured to receive parameter updates for a machine learning model from a plurality of edge servers and send updated parameters for the machine learning model to the plurality of edge servers, thereby synchronizing the machine learning model on the plurality of edge servers. Parameter communication module 138 can communicate data with edge servers (e.g., edge servers 106) in any suitable way. In one example, parameter communication module 138 sends and receives data via a transceiver module of global update system 112 (not shown) similar to transceiver module 122.

Parameter communication module 138 receives data, such as updated local parameters, from parameter sending module 130. Parameter communication module 138 sends data, such as global parameters of a machine learning model obtained from global update module 140, to parameter receiving module 126. Data received and data sent by parameter communication module 138, along with any suitable information used by or calculated by parameter communication module 138 are stored in storage 136 and made available to global update system 112. In one example, parameter communication module 138 receives $\Delta z_k^{i+1}$, $\Delta u_k^{i+1}$, $h_k$, and $\eta_k$ from parameter sending module 130, and provides updated global parameters $z^{i+1}$ and $u^{i+1}$ generated by global update module 140 to parameter receiving module 126.

Global update module 140 is representative of functionality configured to update parameters of a machine learning model based on parameter updates received from edge servers 106. Global update module 140 can update parameters of a machine learning model in any suitable way. In one example, global update module 140 updates global parameters of a machine learning model from a weighted average of parameter updates received from edge servers 106 to form updated global parameters of the machine learning model. For instance, global update module 140 can receive updated parameters $\Delta z_k^{i+1}$ and $\Delta u_k^{i+1}$ from a plurality of edge servers via parameter communication module 138, and update global parameters $z_i$ and $u_i$ according to $$z^{i+1} \leftarrow z^i + \sum_{k=1}^{K} \frac{\eta_k}{\eta} \cdot h_k \odot \Delta z_k^{i+1}$$

$$u^{i+1} \leftarrow u^i + \sum_{k=1}^{K} \frac{\eta_k}{\eta} \cdot h_k \odot \Delta u_k^{i+1}$$

where $\odot$ denotes element-by-element multiplication between two vectors and $\eta = \sum_{k=1}^{K} \eta_k$. Hence, a weighted average is computed with weights determined from designators included in parameter updates received from the plurality of edge servers, and more weight is given to edge servers having a greater number of data points, as indicated by $h_k$ and $\eta_k$.

Global update module 140 pushes the updates of the global parameters to the edge servers by sending $z^{i+1}$ and $u^{i+1}$ to edge servers 106, thereby synchronizing the machine learning model on the edge servers, and completing one iteration of updating the machine learning model. A subsequent iteration is performed when machine learning system 110 on edge servers 106 generates updated local parameters for the machine learning model. Global parameters updated by global update module 140, along with any suitable information used by or calculated by global update module 140 are stored in storage 136 and made available to global update system 112.

Accordingly, machine learning system 110 and global update system 112 work in conjunction to communicate data between a plurality of edge servers and a global server to update a machine learning model on the edge servers based on fresh client data arriving at the edge servers, rather than waiting for client data to arrive at the global server. Hence, latency is significantly reduced and a machine learning model can be trained with machine learning system 110 and global update system 112 for use with real-time services, such as streaming-data services.

Having considered an example digital medium environment, consider now a discussion of an example system usable to update machine learning models on edge servers in accordance with one or more aspects of the disclosure.

Example Machine Learning Update System

Figure 2:
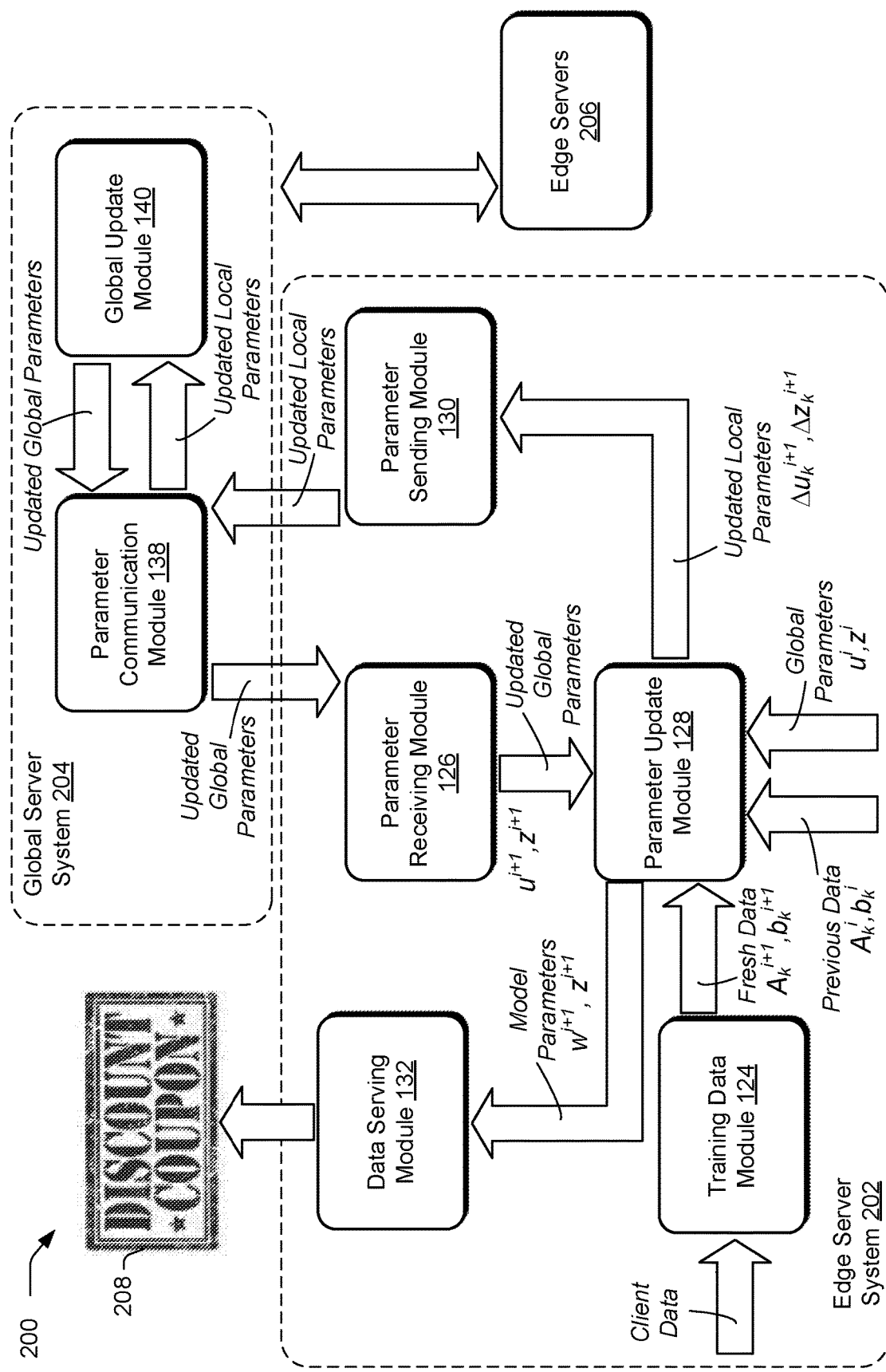
FIG. 2 illustrates an example system usable to update machine learning models on edge servers in accordance with one or more aspects of the disclosure.

FIG. 2 illustrates an example system 200 usable to update machine learning models on edge servers in accordance with one or more aspects of the disclosure. In this implementation, system 200 includes the modules of machine learning application 116 and global update system 112 as described in FIG. 1, e.g., training data module 124, parameter receiving module 126, parameter update module 128, parameter sending module 130, data serving module 132, parameter communication module 138, and global update module 140. System 200 is one example of a machine learning update system that can be constructed using the modules of machine learning application 116 and global update system 112. For instance, signals can be redefined, and modules can be modified, combined, divided, added, or removed to form a modified system, without altering the functionality of system 200. Accordingly, such modified systems are considered to be within the scope of the disclosure.

Furthermore, for simplicity discussion of system 200 is generally limited to the modules of machine learning application 116, global update system 112, and a description of some of their interconnects. System 200 can, however, include any suitable signals and communications between modules omitted for simplicity. Such signals may include system clocks, counters, data flags, sequence indicators, reset signals, iteration numbers, and the like. In one example, system 200 can operate in real time (e.g., with no perceptible delay to a client). Accordingly, signals can be calculated by the modules of system 200 and communicated between the modules of system 200 without significant delay, so that parameters of a machine learning model can be updated, and data served to a client computing device based on the updated machine learning model without perceptible delay to a user (e.g., an operator of a client computing device, such as one of computing devices 102 in FIG. 1).

Moreover, system 200 can be implemented on any suitable device or devices. For instance, system 200 includes edge server system 202 and global server system 204. Edge server system 202 is an example of machine learning system 110 in FIG. 1, and can be implemented on any suitable server, such as one or more of edge servers 106 in FIG. 1. In one example, edge server system 202 is copied and implemented on each of a plurality of edge servers, such as on edge servers 206. Subscript k denotes an edge server index among K edge servers. Hence, discussion of edge server system 202 is not limited to one edge server, but applies to copies of edge server system 202 implemented on edge servers 206. Global server system 204 is an example of global update system 112, and can be implemented on any suitable global server, such as global server 108 in FIG. 1.

System 200 updates a machine learning model on a plurality of edge servers in an iterative fashion. One iteration includes communication from edge server system 202 to global server system 204, and communication from global server system 204 back to edge server system 202. For instance, one iteration may start with training data module 124 receiving fresh client data and initiating parameter update module 128 to generate updated local parameters of the machine learning model that are then communicated to global server system 204. Global server system 204 generates updated global parameters of the machine learning model that are then pushed from a global server to a plurality of edge servers, thereby synchronizing the machine learning model on the edge servers and completing one iteration of updating the machine learning model. In one example, this iterative process is continued until values of the global parameters generated by the global server change by an amount below a convergence threshold from one iteration to another iteration.

Training data module 124 receives client data, e.g., data indicative of a user behavior from a client device, such as one of computing devices 102 in FIG. 1, that can be used as training data for updating a machine learning model. In one example, client data received by training data module 124 is fresh data that is received after global parameters of a machine learning model are updated and before the fresh data is provided to a global server implementing global server system 204. Additionally or alternatively, fresh data can include previous data, e.g., client data from a previous iteration of updating a machine learning model.

Matrix $A_k$ and vector $b_k$ discussed above are examples of data received by training data module 124, and represent input data and output data corresponding to the input data, respectively, that are known. Because this data is known and represents input and output data pairs, it is suitable to train a machine learning model implemented on edge servers, such as edge servers 106 in FIG. 1 and edge servers 206 in FIG. 2.

Training data module 124 provides fresh data (e.g., data received after a most recent iteration for updating parameters of a machine learning model) to parameter update module 128. Because this data is fresh data, it is illustrated with iteration number i+1, e.g., as $A_k^{i+1}$ and $b_k^{i+1}$ in FIG. 2, to emphasize that this fresh data has not yet reached a global server and is available to update parameters of a machine learning model on a current iteration.

Parameter update module 128 receives fresh data $A_k^{i+1}$ and $b_k^{i+1}$ from training data module 124. Parameter update module 128 also obtains previous data $A_k^i$ and $b_k^i$, such as client data used in a previous iteration of updating parameters of a machine learning model. In one example, previous data $A_k^i$ and $b_k^i$ are obtained by parameter update module 128 from training data module 124 and stored by parameter update module 128 for use in subsequent iterations of updating parameters of a machine learning model. Parameter update module 128 also obtains previous global parameters $u^i$ and $z^i$. For instance, previous global parameters $u^i$ and $z^i$ can be obtained from parameter receiving module 126 at the end of a previous iteration of updating parameters of a machine learning model.

Parameter update module 128 updates local parameters of a machine learning model to form updated local parameters based on fresh data $A_k^{i+1}$ and $b_k^{i+1}$ at the edge server that indicates a user behavior and is received from a client device, and global parameters $u^i$ and $z^i$ received from a global server, as described above. For instance, parameter update module 128 generates updated local parameters $w_k^{i+1}$, $z_k^{i+1}$, and $u_k^{i+1}$. In the example in FIG. 2, updated local parameters generated by parameter update module 128 include differences between updated local parameters generated by parameter update module 128 (e.g., $z_k^{i+1}$ $u_k^{i+1}$) and global parameters received from a global server (e.g., $z^i$ and $u^i$) denoted by $\Delta z_k^{i+1}$ and $\Delta u_k^{i+1}$.

Parameter update module 128 provides updated local parameters $\Delta z_k^{i+1}$ and $\Delta u_k^{i+1}$ to parameter sending module 130. In one example, updated local parameters provided by parameter update module 128 to parameter sending module 130 include indicators $h_k$ and $\eta_k$. Parameter sending module 130 sends the updated local parameters to parameter communication module 138 of a global server. In one example, parameter update module 128 updates local parameters of a machine learning model to form the updated local parameters and parameter sending module 130 sends the updated local parameters to a global server responsive to training data module 124 receiving a threshold amount of fresh data from a client device (e.g., an amount of data above a threshold amount of data, such as once a user clicks on five or ten items on a web page).

Parameter sending module 130 can send updated local parameters to parameter communication module 138 in any suitable way. In one example, parameter sending module 130 sends parameter updates to parameter communication module 138, including $\Delta z_k^{i+1}$, $\Delta u_k^{i+1}$, $h_k$, and $\eta_k$, by packetizing data of the parameter updates into data packets that include a header identifying the edge server and payload including the parameter updates.

Parameter communication module 138 of global server system 204 receives updated local parameters from parameter sending module 130. Parameter communication module 138 receives parameter updates for a machine learning model from a plurality of edge servers, including an edge server implementing edge server system 202 and edge servers 206. Parameter communication module 138 provides the updated local parameters received from a plurality of edge servers to global update module 140.

Global update module 140 receives updated local parameters corresponding to a plurality of edge servers and generates updated global parameters $z^{i+1}$ and $u^{i+1}$. In one example, global update module 140 updates global parameters of a machine learning model from a weighted average of parameter updates including updated local parameters to form updated global parameters of the machine learning model. The weighted average is computed with weights determined from designators included in the parameter updates received from the plurality of edge servers. For instance, global update module 140 generates updated global parameters $z^{i+1}$ and $u^{i+1}$ using a weighted average of $\Delta z_k^{i+1}$ and $\Delta u_k^{i+1}$, respectively, with weights determined from $h_k$ and $\eta_k$, as described above.

Global update module 140 provides updated global parameters $z^{i+1}$ and $u^{i+1}$ to parameter communication module 138. Parameter communication module 138 sends the updated global parameters to parameter receiving module 126. Parameter receiving module 126 provides the updated global parameters to parameter update module 128, thereby synchronizing the machine learning model on edge server system 202 and edge servers 206.

Parameter update module 128 provides model parameters to data serving module 132. Parameter update module 128 can provide any suitable model parameters of a machine learning model to data serving module 132 to serve data to a client device, such as one or more of computing devices 102 in FIG. 1. In one example, parameter update module 128 provides local model parameters $w_k^{i+1}$ to data serving module 132, and data serving module serves data to one or more client devices according to a machine learning model configured with local model parameters $w_k^{i+1}$. Additionally or alternatively, parameter update module 128 provides global model parameters $z^{i+1}$ to data serving module 132, and data serving module serves data to one or more client devices according to a machine learning model configured with global model parameters $z^{i+1}$. For instance, parameter update module 128 may provide local model parameters $w_k^{i+1}$ to data serving module 132 to serve data to client devices until a machine learning model is synchronized on a plurality of edge servers (e.g., edge servers 206). Once the machine learning model is synchronized on the plurality of edge servers, parameter update module 128 may provide global model parameters $z^{i+1}$ to data serving module 132 to serve data to client devices.

Data serving module 132 can serve any suitable data to any suitable computing device. In the example illustrated in FIG. 2, data serving module 132 serves a discount coupon 208. For instance, discount coupon 208 may include discounts for automotive parts from an online automotive parts dealer responsive to client data obtained by training data module 124 indicating a user selection (e.g., a user click on a web page) of an automotive part, such as a car radiator.

System 200 constitutes an improvement over systems that update a machine learning model on a global server by waiting for client data (e.g., training data) to reach the global server. By generating updated local parameters of the machine learning model at a plurality of edge servers using fresh data on the edge servers, and not waiting for the data to reach a global server, latency of system 200 is significantly reduced. Moreover, by updating global parameters of the machine learning model in a deterministic manner based on the updated local parameters from the edge servers, rather than by including randomization steps, global parameters of the machine learning model converge quickly to their optimal values. Accordingly, system 200 is suitable for real-time services that support streaming data. Furthermore, because system 200 generates updated local parameters at each edge server based on fresh client data at the edge servers, system 200 imposes no constraints on the statistics of the client data across the plurality of edge servers, such as systems that require homogenous data across nodes. Hence, system 200 is robust to heterogeneous data across the plurality of edge servers, as is typical for geographically distributed edge servers. Accordingly, system 200 is better suited to updating parameters of a machine learning model implemented on a plurality of edge servers than other systems that constrain or assume data is homogeneous among the edge servers.

Having considered an example system 200, consider now a discussion of example procedures for updating a machine learning model on edge servers in accordance with one or more aspects of the disclosure.

Example Procedures

Figure 3:
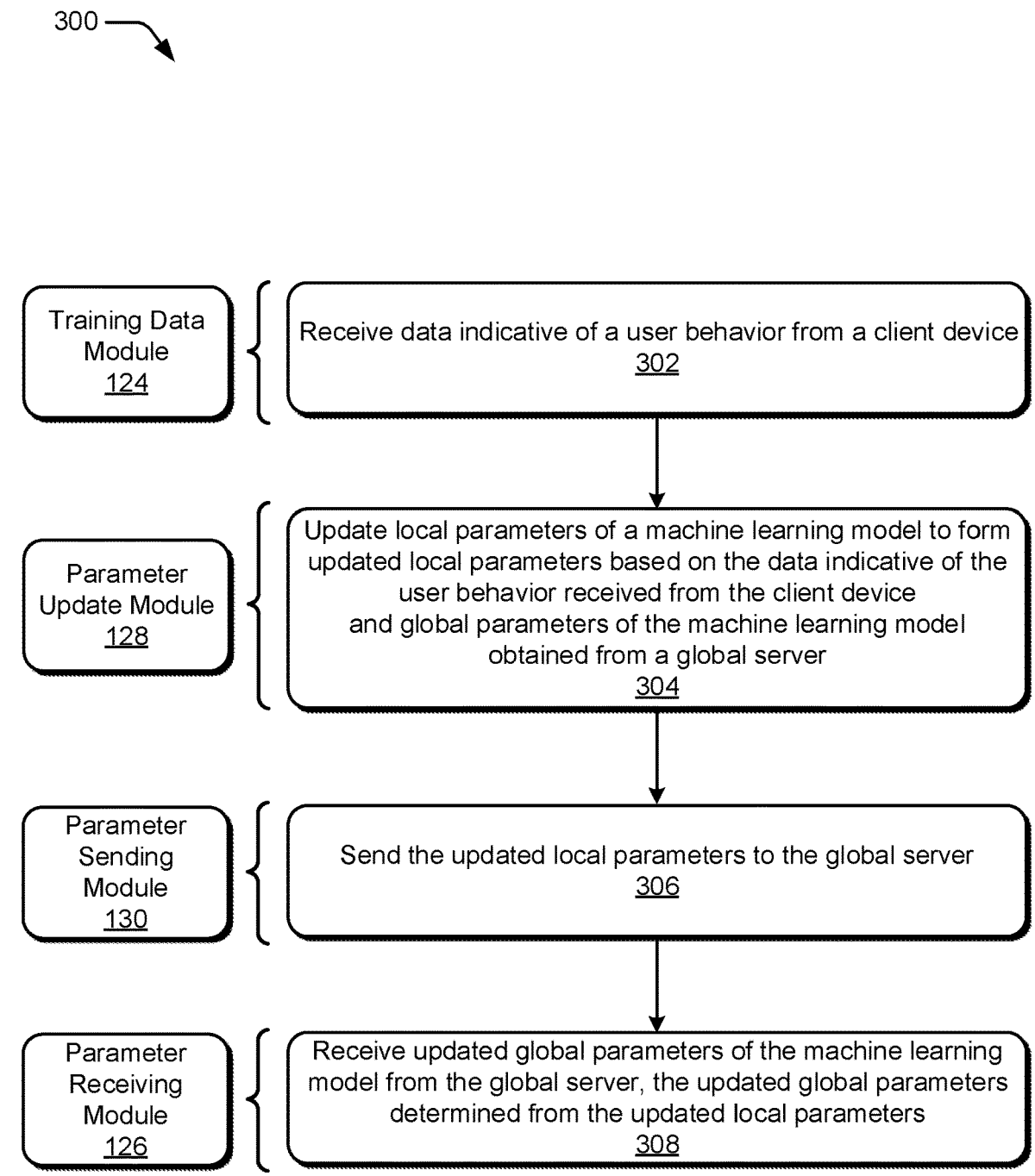
FIG. 3 illustrates a flow diagram depicting an example procedure in accordance with one or more aspects of the disclosure.

FIG. 3 illustrates an example procedure 300 for updating a machine learning model on edge servers in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of one of edge servers 106 of FIG. 1 that make use of a machine learning system, such as edge server system 202 or machine learning system 110. A machine learning system implementing procedure 300 may be an independent application that has been installed on the computing device, a service hosted by a service provider that is accessible by the computing device, a plug-in module to the computing device, or combinations thereof.

Data indicative of a user behavior is received from a client device (block 302). In one example, training data module 124 receives data indicative of a user behavior from a client device. Computing devices 102 in FIG. 1 are examples of client devices, and matrix $A_k$ and vector $b_k$ are examples of data indicative of a user behavior received from a client device.

In one example, data indicative of the user behavior received from the client device includes fresh data received by the edge server after the global parameters of a machine learning model are obtained from the global server. Additionally or alternatively, data indicative of the user behavior received from the client device also includes previous data received by the edge server before the global parameters of the machine learning model are obtained from the global server, such as during a previous iteration of updating the global parameters. In one example, data indicative of the user behavior includes input data and output data corresponding to the input data, the input data and the output data being known. For instance, data indicative of the user behavior can include training data.

Local parameters of a machine learning model are updated to form updated local parameters based on the data indicative of the user behavior received from the client device and global parameters of the machine learning model obtained from a global server (block 304). In one example, parameter update module 128 updates local parameters of a machine learning model to form updated local parameters based on the data indicative of the user behavior received from the client device and global parameters of the machine learning model obtained from a global server.

Additionally or alternatively, parameter update module 128 can update the local parameters of the machine learning model to form the updated local parameters when the data indicative of the user behavior from the client device has not reached the global server. The machine learning model can include a linear regression model, a logistic regression model, or a feedforward neural network.

The updated local parameters are sent to the global server (block 306). In one example, parameter sending module 130 sends the updated local parameters to the global server. Updated local parameters can be sent in any suitable way, such as in data packets.

In one example, parameter update module 128 updates the local parameters of the machine learning model to form the updated local parameters and parameter sending module 130 sends the updated local parameters to the global server responsive to training data module 124 receiving a threshold amount of fresh data from the client device, such as a predetermined number of user clicks.

Additionally or alternatively, the updated local parameters include a proxy parameter that represents the machine learning model at convergence. In one example, the proxy parameter is determined by applying a soft threshold to one of the updated local parameters.

Updated global parameters of the machine learning model are received from the global server (block 308). The updated global parameters are determined from the updated local parameters. In one example, parameter receiving module 126 receives updated global parameters of the machine learning model from the global server.

Additionally or alternatively, receiving the updated global parameters from the global server synchronizes the machine learning model on the edge server with other edge servers. Updated global parameters received from the global server can be further determined from parameter updates from the other edge servers (e.g., from parameter updates from a plurality of edge servers). In one example, the edge server and the other edge servers receive different respective client data. Additionally or alternatively, the edge server and the other edge servers can have different processing resources from each other.

In one example, data serving module 132 serves data to the client device according to the machine learning model with the updated parameters (e.g., $w_k^{i+1}$) until different global parameters are received from the global server, such as different global parameters received from the global server on a subsequent iteration of updating the machine learning model (e.g., $z^{i+1}$).

Additionally or alternatively, the receiving the data indicative of the user behavior, updating the local parameters, sending the updated local parameters to the global server, and receiving the updated global parameters from the global server can be repeated until values of the global parameters change by an amount below a convergence threshold from one iteration to another iteration.

Figure 4:
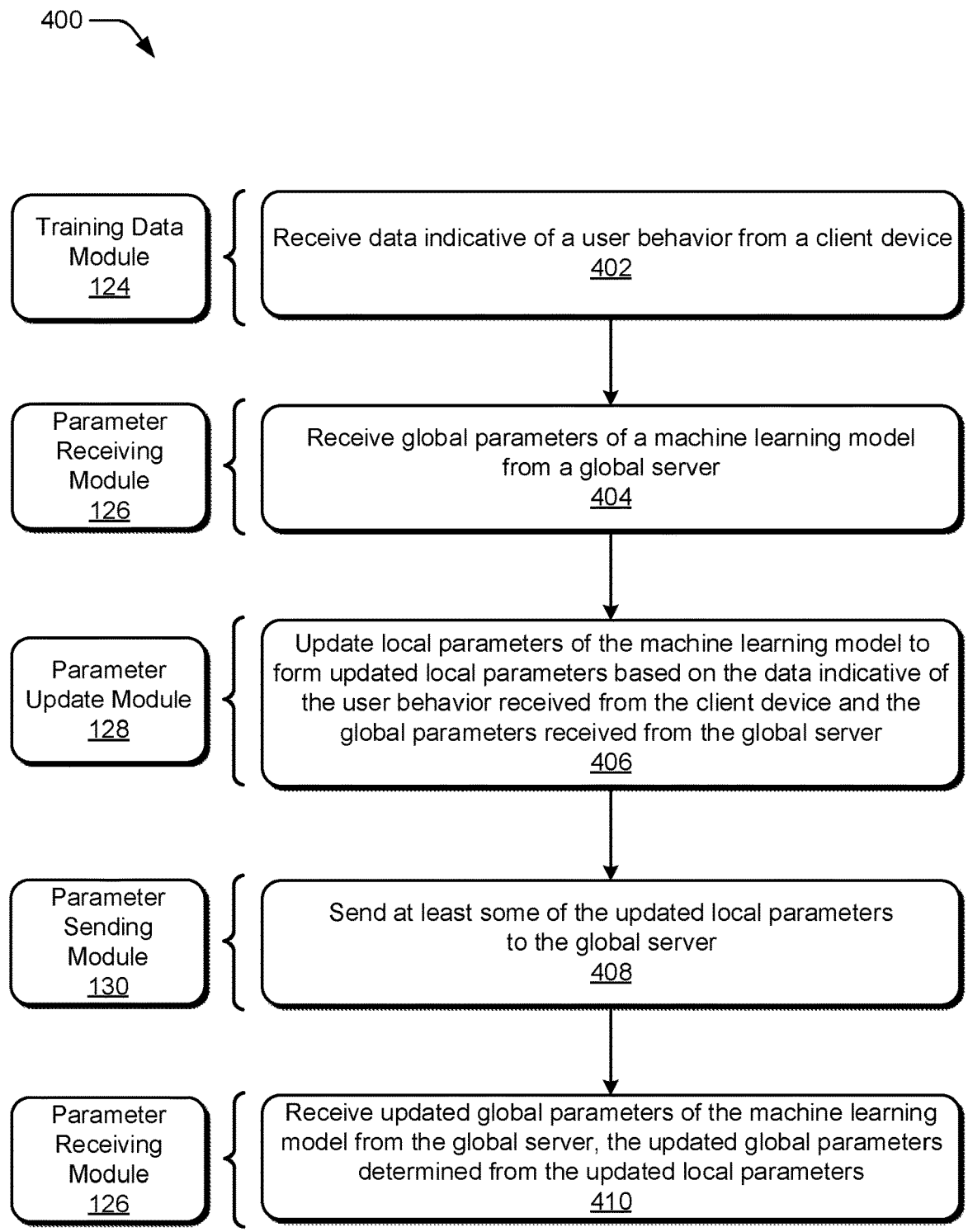
FIG. 4 illustrates a flow diagram depicting an example procedure in accordance with one or more aspects of the disclosure.

FIG. 4 illustrates an example procedure 400 for updating a machine learning model on edge servers in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of one of edge servers 106 of FIG. 1 that make use of a machine learning system, such as edge server system 202 or machine learning system 110. A machine learning system implementing procedure 400 may be an independent application that has been installed on the computing device, a service hosted by a service provider that is accessible by the computing device, a plug-in module to the computing device, or combinations thereof.

Data indicative of a user behavior is received from a client device (block 402). In one example, training data module 124 receives training data indicative of a user behavior from a client device.

Global parameters of a machine learning model are received from a global server (block 404). In one example, parameter receiving module 126 receives global parameters of the machine learning model from a global server. Additionally or alternatively, global parameters received from the global server comprise a randomized initialization to train a plurality of edge servers including the edge server starting from a same parameter setting. For instance, the global server may initialize a machine learning model on a plurality of edge servers by providing an initialization vector to the plurality of edge servers. Parameters of the machine learning model can be updated starting from the initialization vector. In one example, the machine learning model includes a linear regression model, a logistic regression model, or a feedforward neural network.

Local parameters of the machine learning model are updated to form updated local parameters based on the data indicative of the user behavior received from the client device and the global parameters received from the global server (block 406). In one example, parameter update module 128 updates local parameters of the machine learning model to form updated local parameters based on the data indicative of the user behavior received from the client device and the global parameters received from the global server.

In one example, parameter update module 128 updates the local parameters by updating a first parameter based on the data indicative of the user behavior received from the client device, a Lagrangian penalty variable (e.g., $\rho$), and a Lagrangian dual variable included in the global parameters received from the global server (e.g., $u^i$) to form an updated first parameter (e.g., $w_k^{i+1}$). A threshold, such as a soft threshold (e.g., $S_\tau$), is applied to a combination of the updated first parameter and a ratio of the Lagrangian dual variable and the Lagrangian penalty variable to form an updated proxy parameter (e.g., $z_k^{i+1}$) included in the at least some of the updated local parameters sent to the global server.

Additionally or alternatively, parameter update module 128 updates the local parameters by updating the Lagrangian dual variable based on a difference of the updated first parameter and the updated proxy parameter to form an updated Lagrangian dual variable, the updated Lagrangian dual variable included in the at least some of the updated local parameters sent to the global server.

At least some of the updated local parameters are sent to the global server (block 408). In one example, parameter sending module 130 sends at least some of the updated local parameters to the global server. Additionally or alternatively, parameter sending module 130 can send the updated local parameters to the global server as differences between the updated local parameters and the global parameters received from the global server.

Updated global parameters of the machine learning model are received from the global server, the updated global parameters determined from the updated local parameters (block 410). In one example, parameter receiving module 126 receives updated global parameters of the machine learning model from the global server, the updated global parameters determined from the updated local parameters.

Figure 5:
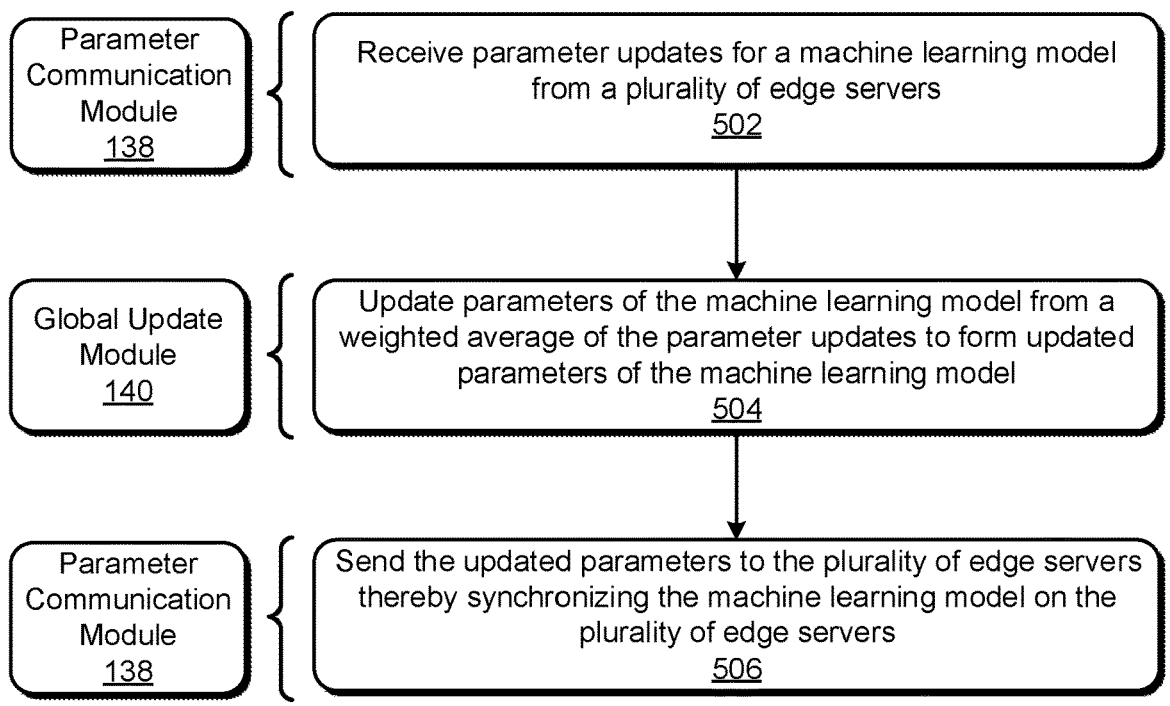
FIG. 5 illustrates a flow diagram depicting an example procedure in accordance with one or more aspects of the disclosure.

FIG. 5 illustrates an example procedure 500 for updating a machine learning model on edge servers in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of global server 108 of FIG. 1 that make use of a global update system, such as global server system 204 or global update system 112. A global update system implementing procedure 500 may be an independent application that has been installed on the computing device, a service hosted by a service provider that is accessible by the computing device, a plug-in module to the computing device, or combinations thereof.

Parameter updates for a machine learning model are received from a plurality of edge servers (block 502). In one example, parameter communication module 138 receives parameter updates for a machine learning model are received from a plurality of edge servers. In one example, parameter updates includes $\Delta z_k^{i+1}$, $\Delta u_k^{i+1}$, $h_k$, and $\eta_k$, as described above. Additionally or alternatively, the parameter updates include a parameter update vector including updates to proxy parameters for the machine learning model and a Lagrangian update vector including updates to Lagrangian variables. For instance, parameter updates can include a concatenation of $\Delta z_k^{i+1}$ and $\Delta u_k^{i+1}$, a concatenation of $h_k$ and $\eta_k$, or combinations thereof. In one example, the machine learning model includes a linear regression model, a logistic regression model, or a feedforward neural network.

Parameters of the machine learning model are updated from a weighted average of the parameter updates to form updated parameters of the machine learning model (block 504). In one example, global update module 140 updates parameters of the machine learning model from a weighted average of the parameter updates to form updated parameters of the machine learning model. Additionally or alternatively, the weighted average is computed with weights determined from designators included in the parameter updates received from the plurality of edge servers, such as $h_k$ and $\eta_k$.

The updated parameters are sent to the plurality of edge servers, thereby synchronizing the machine learning model on the plurality of edge servers (block 506). In one example, parameter communication module 138 sends the updated parameters to the plurality of edge servers, thereby synchronizing the machine learning model on the plurality of edge servers.

The procedures described herein constitute an improvement over procedures that update a machine learning model on a global server by waiting for client data (e.g., training data) to reach the global server. By generating updated local parameters of the machine learning model at a plurality of edge servers using fresh data on the edge servers, and not waiting for the data to reach a global server, latency of procedures described herein is significantly reduced. Moreover, by updating global parameters of the machine learning model in a deterministic manner based on the updated local parameters from the edge servers, rather than by including randomization steps, global parameters of the machine learning model converge quickly to their optimal values. Accordingly, the procedures described herein are suitable for real-time services that support streaming data. Furthermore, because the procedures described herein generate updated local parameters at each edge server based on fresh client data at the edge servers, the procedures described herein impose no constraints on the statistics of the client data across the plurality of edge servers, such as procedures that require homogenous data across nodes. Hence, the procedures described herein are robust to heterogeneous data across the plurality of edge servers, as is typical for geographically distributed edge servers. Accordingly, the procedures described herein are better suited to updating parameters of a machine learning model implemented on a plurality of edge servers than other procedures that constrain or assume data is homogeneous among the edge servers.

Having considered example procedures in accordance with one or more implementations, consider now example performance results in accordance with one or more aspects of the disclosure.

Example Performance Results

To illustrate the advantages of the systems and procedures described herein, performance of the systems and procedures described herein is compared to performance of a federated stochastic variance reduced gradient (FSVRG) algorithm described in *Distributed Machine Learning for On-Device Intelligence*, CoRR 1610.02527, 2016, by Jakub Konecny, H. Brendan McMahan, Daniel Ramage, and Peter Richtarik. The FSVRG algorithm updates a machine learning algorithm on a client device using a stochastic, rather than deterministic update. Because the FSVRG algorithm requires that the client data is kept at the client device for security reasons, the FSVRG algorithm is generally not suitable to updating a machine learning model on edge servers using the client data on the edge servers. However, by violating the security conditions and providing the client data to the edge servers, the FSVRG algorithm is suitable for comparing convergence performance with the systems and procedures described herein.

Figure 6:
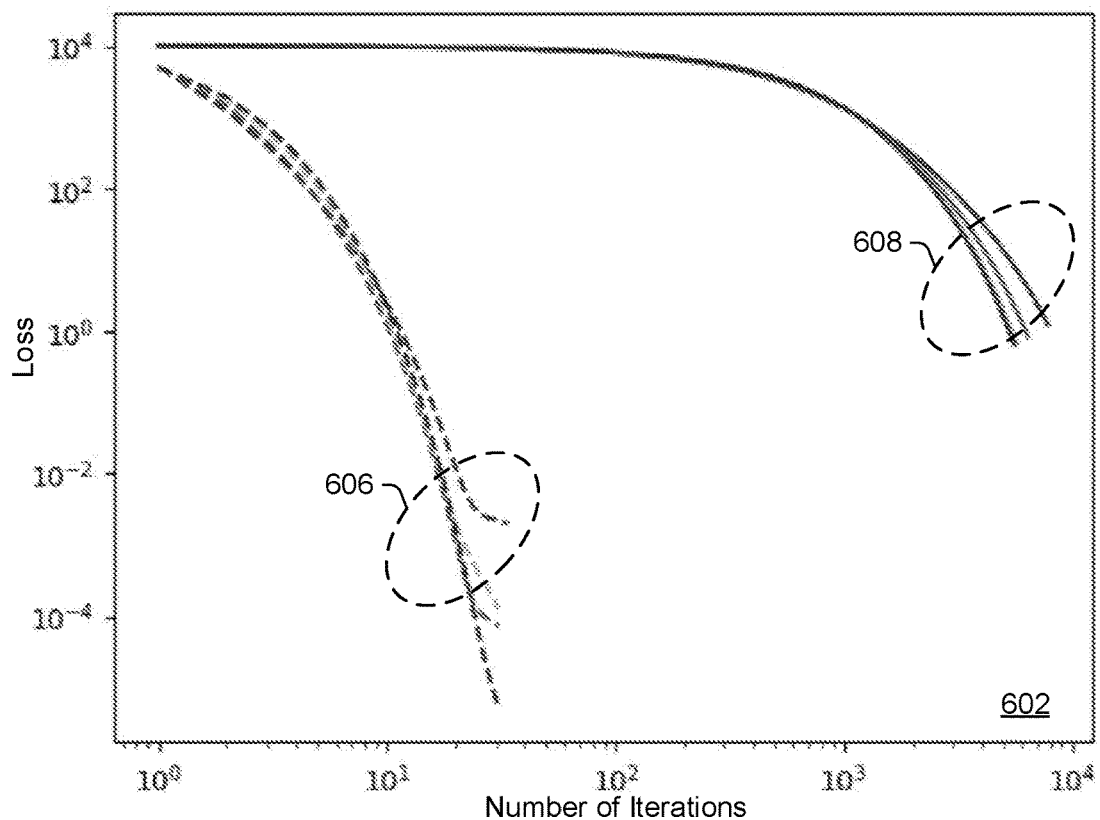
FIG. 6 illustrates example performance results in accordance with one or more aspects of the disclosure.
Figure 6:
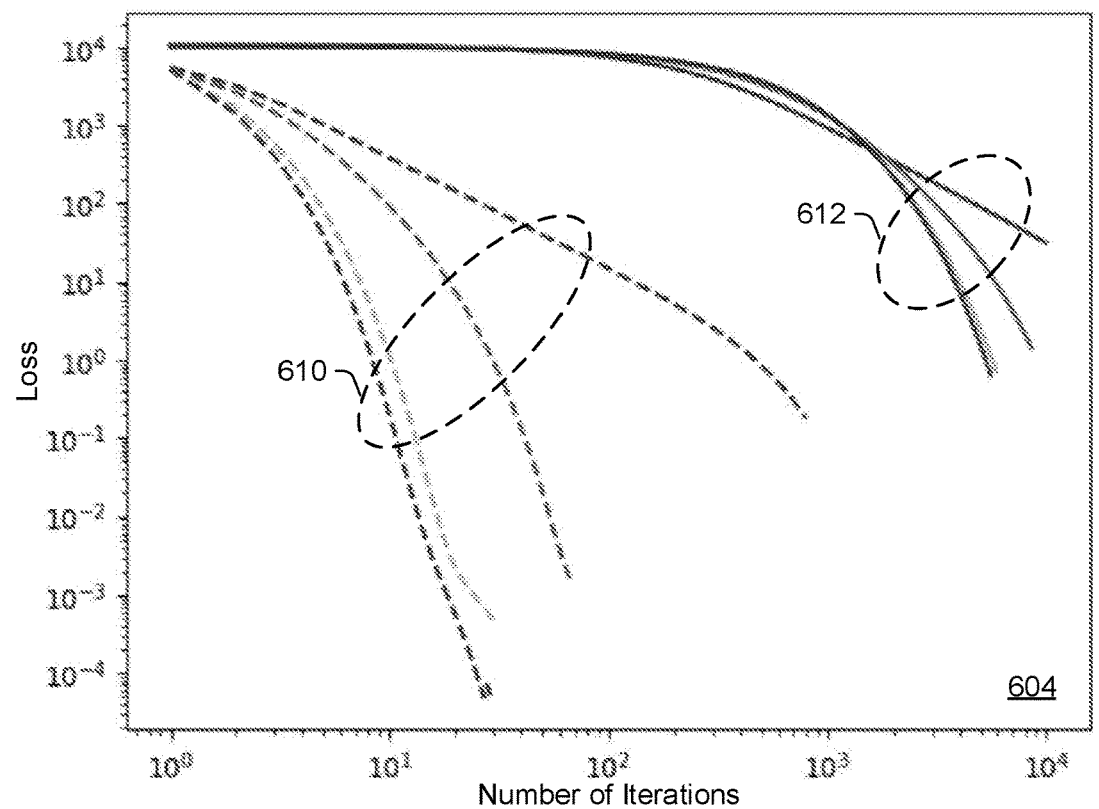

FIG. 6 illustrates example performance results 600 in accordance with one or more aspects of the disclosure. Performance results 600 includes performance results 602 and performance results 604. Performance results 602 illustrate performance for a machine learning model distributed with balanced data (e.g., each edge server processes a same number of data points), and performance results 604 illustrate performance for a machine learning model distributed with unbalanced data (e.g., each edge server processes a different number of data points). Both balanced data and unbalanced data are heterogeneous data, such as non-independent or non-identically distributed data.

Performance results 602 and performance results 602 illustrate performance for updating a machine learning model according to a loss function defined as $$\text{Loss}^i = \frac{1}{2}\sum_{k=1}^{K} l_k(w^i).$$

Recall that $l_k(w^i) = \|b_k - A_k w^i\|_2^2$. Training data $A_k$ and $b_k$ is selected from among $n=10^6$ rows each represented by approximately $m=10^3$ features. For the balanced data of performance results 602, each edge server is simulated with a process that is given 500 data points, $b_k \in \mathbb{R}^{500}$. For the unbalanced data of performance results 604, the $k^{th}$ edge server is simulated with a process given 20·k data points, so $b_k \in \mathbb{R}^{20\cdot k}$ and the number of data points is dependent on k to model unbalanced data of edge servers.

Performance results 602 depicts results for balanced data among a plurality of edge servers and plots loss versus number of iterations for updating a machine learning model on the plurality of edge servers. Performance results 602 includes traces 606 depicting results of the systems and procedures described herein, and traces 608 depicting results of the FSVRG algorithm for comparison. Traces 606 and traces 608 each contain multiple traces corresponding to different numbers of edge servers between 10 and 50 (e.g., K=10, 20, 30, 40, or 50). As can be seen in performance results 602 by comparing traces 606 to traces 608, the systems and procedures described herein converge much more quickly (e.g., 20-30 iterations) compared to the FSVRG algorithm, which is still not converged after thousands of iterations.

Performance results 604 depicts results for unbalanced data among a plurality of edge servers and plots loss versus number of iterations for updating a machine learning model on the plurality of edge servers. Performance results 604 includes traces 610 depicting results of the systems and procedures described herein, and traces 612 depicting results of the FSVRG algorithm for comparison. Traces 610 and traces 612 each contain multiple traces corresponding to different numbers of edge servers between 10 and 50 (e.g., K=10, 20, 30, 40, or 50). As can be seen in performance results 604 by comparing traces 610 to traces 612, the systems and procedures described herein converge much more quickly (e.g., 20-100 iterations for most K) compared to the FSVRG algorithm, which is still not converged after thousands of iterations.

Accordingly, as illustrated by performance results 600, the systems and procedures described herein constitute an improvement over other systems and techniques. By generating updated local parameters of the machine learning model at a plurality of edge servers using fresh data on the edge servers, and not waiting for the data to reach a global server, latency of the systems and procedures described herein is significantly reduced. Moreover, by updating global parameters of the machine learning model in a deterministic manner based on the updated local parameters from the edge servers, rather than by including randomization steps, global parameters of the machine learning model converge quickly to their optimal values. Accordingly, the systems and procedures described herein are suitable for real-time services that support streaming data. Furthermore, because the systems and procedures described herein generate updated local parameters at each edge server based on fresh client data at the edge servers, the systems and procedures described herein impose no constraints on the statistics of the client data across the plurality of edge servers and are robust to heterogeneous data across the plurality of edge servers, as evidenced by performance results 600. Accordingly, the systems and procedures described herein are better suited to updating parameters of a machine learning model implemented on a plurality of edge servers than other systems and techniques that constrain or assume data is homogeneous among the edge servers.

Having considered example performance results in accordance with one or more implementations, consider now example systems and devices that can be utilized to practice the inventive principles described herein.

Example Systems and Devices

FIG. 7 illustrates an example system generally at 700 that includes example client computing devices 702-1, 702-2, 702-3, 702-4, and 702-5 (collectively 702). Client computing devices 702 can be any suitable client computing device. Computing devices 102 in FIG. 1 are examples of client computing devices 702. Client computing devices 702 may include an on-chip system, multiple computing devices, combinations thereof, or any other suitable computing device or computing system. Accordingly, FIG. 7 illustrates client computing devices 702 as one or more of a tablet, a laptop computer, a smart phone, smart eye glasses, and a camera, though these examples are illustrative and in no way are meant to limit the type or number of devices included in client computing devices 702.

Furthermore, client computing devices 702 are coupled to "cloud" 704 including platform 706 that is representative of one or more computing systems and devices that may implement the various techniques described herein, such as edge servers, global servers, or combinations thereof. This is illustrated through inclusion of machine learning application 116, machine learning system 110, edge server system 202, global update system 112, and global server system 204 in modules of platform 706, which operate as described above.

Functionality of client computing devices 702 may be implemented all or in part through use of a distributed system, such as over a "cloud" 704 via a platform 706. Furthermore, platform 706 may host data accessible by client computing devices 702, and therefore client computing devices 702 may be required to be authenticated to platform 706.

Platform 706 includes a processing system 708, one or more computer-readable media 710, and one or more I/O interfaces 712 that are communicatively coupled to each other. Although not shown, platform 706 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 708 is representative of functionality to perform one or more operations using hardware. Accordingly, processing system 708 is illustrated as including hardware elements 714 that may be configured as processors, functional blocks, and so forth. This may include implementation in hardware as an application specific integrated circuit or other logic device formed using one or more semiconductors. Hardware elements 714 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 118 and processors 134 in FIG. 1 are examples of processing system 708.

Computer-readable media 710 (e.g., computer-readable storage media) is illustrated as including memory/storage 716. Storage 120 in FIG. 1 is an example of memory/storage included in memory/storage 716. Memory/storage component 716 may include volatile media (such as random access memory (RAM)), nonvolatile media (such as read only memory (ROM), Flash memory, optical disks, magnetic disks, and so forth), or combinations thereof. Memory/storage component 716 may include fixed media (e.g., RAM, ROM, a fixed hard drive, and so on) as well as removable media (e.g., Flash memory, a removable hard drive, an optical disc, and so forth). Computer-readable media 710 may be configured in a variety of other ways as further described below.

Input/output interface(s) 712 are representative of functionality to allow a user (e.g., a system administrator of platform 706) to enter commands and information to platform 706, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, platform 706 may be configured in a variety of ways as further described below to support user interaction.

Platform 706 also includes applications 718. Applications 718 are representative of any suitable applications capable of running on platform 706, and may include a web browser which is operable to access various kinds of web-based resources (e.g., assets, media clips, images, content, configuration files, services, user profiles, advertisements, coupons, and the like. Applications 718 include machine learning application 116, as previously described. Furthermore, applications 718 includes any applications supporting machine learning system 110, and system 200.

Cloud 704 includes and is representative of a platform 706. Platform 706 abstracts underlying functionality of hardware (e.g., servers) and software resources of cloud 704, and includes resources 720. Resources 720 may include applications, data, services, and content that can be utilized while computer processing is executed on servers that are remote from client computing devices 702. Resources 720 can also include services provided over the Internet, through a subscriber network, such as a cellular or Wi-Fi network, or combinations thereof.

Resources 720 include machine learning model store 722, which operates to provide one or more machine learning models on edge servers 724, global server 726, or combinations thereof. Edge servers 106 in FIG. 1 are examples of edge servers 724, and global server 108 in FIG. 1 is an example of global server 726. Accordingly, edge servers 724 include machine learning system 110 and edge server system 202, and global server 726 includes global update system 112 and global server system 204, as described above.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by platform 706. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the platform 706, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 714 and computer-readable media 710 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 714, or combinations thereof. Platform 706 may be configured to implement particular instructions and functions corresponding to the software and hardware modules. Accordingly, implementation of a module that is executable by platform 706 as software may be achieved at least partially in hardware, e.g., through use of computer-readable storage media and hardware elements 714 of processing system 708. The instructions and functions may be executable/operable by one or more articles of manufacture (for example, processing system 708) to implement techniques, modules, and examples described herein.

Conclusion

In one or more implementations, a digital medium environment includes at least one computing device. Systems and techniques are described herein for updating a machine learning model on edge servers. Local parameters of the machine learning model are updated at a plurality of edge servers using fresh data on the edge servers, rather than waiting for the data to reach a global server to update the machine learning model. Hence, latency is significantly reduced, making the systems and techniques described herein suitable for real-time services that support streaming data. Moreover, by updating global parameters of the machine learning model at a global server in a deterministic manner based on parameter updates from the edge servers, rather than by including randomization steps, global parameters of the converge quickly to their optimal values. The global parameters are sent from the global server to the plurality of edge servers at each iteration, thereby synchronizing the machine learning model on the edge servers.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to update a machine learning model instantiated by multiple edge servers implemented as computing devices, a method implemented by an edge server, the method comprising:
   receiving behavior data indicative of a user behavior from a client device;
   receiving global parameters of the machine learning model from a global server that provides the global parameters to the multiple edge servers which instantiate the machine learning model;
   updating local parameters of the machine learning model to form updated local parameters based on the behavior data received from the client device and based on the global parameters of the machine learning model received from the global server;
   serving personalized data back to the client device based on the machine learning model configured with the updated local parameters;
   sending the updated local parameters to the global server; and
   receiving updated global parameters of the machine learning model from the global server, the global server determining the updated global parameters of the machine learning model based on the updated local parameters received from the edge server and from other updated local parameters received from one or more of the multiple edge servers.

2. The method as described in claim 1, further comprising serving the personalized data to the client device according to the machine learning model configured with the updated global parameters.

3. The method as described in claim 1, wherein the updated local parameters include a proxy parameter that represents the machine learning model at convergence.

4. The method as described in claim 1, wherein the machine learning model includes a linear regression model, a logistic regression model, or a feedforward neural network.

5. The method as described in claim 1, further comprising repeating the receiving the behavior data indicative of the user behavior, the updating the local parameters, the sending the updated local parameters to the global server, and the receiving the updated global parameters from the global server until values of the global parameters change by an amount below a convergence threshold.

6. The method as described in claim 1, wherein the edge server updates the local parameters of the machine learning model to form the updated local parameters when the data indicative of the user behavior from the client device has not reached the global server.

7. The method as described in claim 1, wherein the edge server updates the local parameters of the machine learning model to form the updated local parameters and sends the updated local parameters to the global server responsive to the edge server receiving a threshold amount of the behavior data as fresh data from the client device.

8. The method as described in claim 1, wherein the behavior data indicative of the user behavior received from the client device includes fresh data received by the edge server after the global parameters of the machine learning model are received from the global server.

9. The method as described in claim 8, wherein the behavior data indicative of the user behavior received from the client device also includes previous data received by the edge server before the global parameters of the machine learning model are received from the global server.

10. The method as described in claim 1, wherein the receiving the updated global parameters from the global server synchronizes the machine learning model on the edge server with the multiple edge servers.

11. The method as described in claim 10, wherein the updated global parameters received from the global server are further determined from parameter updates from the multiple edge servers.

12. The method as described in claim 10, wherein the parameter updates from the multiple edge servers are determined by the respective multiple edge servers based on different respective client data.

13. The method as described in claim 1, wherein the behavior data indicative of the user behavior includes input data and output data corresponding to the input data, the input data and the output data being known.

14. The method as described in claim 1, wherein the local parameters of the machine learning model are updated as a parameter update vector that includes updates to proxy parameters for the machine learning model and a Lagrangian update vector including updates to Lagrangian variables representing an optimization solved locally by the edge server based on the behavior data received from the client device.

15. In a digital medium environment to update a machine learning model instantiated by multiple edge servers implemented as computing devices, an edge server comprising:
   a processor and a memory device storing modules as instructions that are executable by the processor, the modules implemented at least partially in hardware of at least one computing device, the modules including:
   a training data module to receive behavior data indicative of a user behavior from a client device;
   a parameter receiving module to receive global parameters of the machine learning model from a global server that provides the global parameters to the multiple edge servers which instantiate the machine learning model;
   a parameter update module to update local parameters of the machine learning model to form updated local parameters based on the behavior data received from the client device and based on the global parameters of the machine learning model received from the global server;
   a data serving module to serve personalized data back to the client device based on the machine learning model configured with the updated local parameters;

a parameter sending module to send at least some of the updated local parameters to the global server; and the parameter receiving module to receive updated global parameters of the machine learning model from the global server, the global server determining the updated global parameters of the machine learning model based on the updated local parameters received from the edge server and from other updated local parameters received from one or more of the multiple edge servers.

16. The edge server as described in claim 15, wherein the parameter sending module is configured to send the updated local parameters to the global server as differences between the updated local parameters and the global parameters received from the global server.

17. The edge server as described in claim 15, wherein the machine learning model includes a linear regression model, a logistic regression model, or a feedforward neural network.

18. The edge server as described in claim 15, wherein the global parameters received from the global server comprise a randomized initialization to train the multiple edge servers including the edge server starting from a same parameter setting.

19. The edge server as described in claim 15, wherein the parameter update module is configured to update the local parameters of the machine learning model as a parameter update vector that includes updates to proxy parameters for the machine learning model and a Lagrangian update vector including updates to Lagrangian variables representing an optimization solved locally by the edge server based on the behavior data received from the client device.

* * * * *